(12) United States Patent
Morrison et al.

(10) Patent No.: US 6,422,092 B1
(45) Date of Patent: Jul. 23, 2002

(54) MULTIPLE-PHASE FLOW METER

(75) Inventors: Gerald L. Morrison, College Station; James C. Holste, Bryan; Kenneth R. Hall, College Station, all of TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 09/393,715

(22) Filed: Sep. 10, 1999

Related U.S. Application Data

(63) Continuation-in-part of application No. 09/151,253, filed on Sep. 10, 1998.

(51) Int. Cl.$^7$ .............................................. G01F 1/712
(52) U.S. Cl. ................................................. 73/861.04
(58) Field of Search .................... 73/861.04, 861.02, 73/200; 364/424.05

(56) References Cited

U.S. PATENT DOCUMENTS

| | | | |
|---|---|---|---|
| 4,335,605 A | 6/1982 | Boyd | 73/204 |
| 4,662,219 A | 5/1987 | Nguyen | 73/195 |
| 5,195,380 A | * 3/1993 | Hatton et al. | 73/861.04 |
| 5,295,397 A | * 3/1994 | Hall et al. | 73/861.02 |
| 5,461,932 A | 10/1995 | Hall et al. | 73/861 |
| 5,551,305 A | * 9/1996 | Farchi et al. | 73/861.04 |

FOREIGN PATENT DOCUMENTS

| | | | |
|---|---|---|---|
| EP | 0 684 458 A2 | 11/1995 | G01F/1/74 |

OTHER PUBLICATIONS

Application 09/151253, Sep. 10, 1998.*
International PCT Report dated Jan. 24, 2000 for PCT/US99/20984 filed Sep. 10, 1999.

* cited by examiner

*Primary Examiner*—Benjamin R. Fuller
*Assistant Examiner*—Jewel V. Thompson
(74) *Attorney, Agent, or Firm*—Baker Botts L.L.P.

(57) ABSTRACT

This invention is related to flow meter instrumentation. More particularly, the invention is related to obstruction flow meters which are used in series in a flow conduit to determine the volume flow rate of liquid and gas phases of fluid flowing within the conduit. Multiple flow meters including at least one obstruction type flow meter are positioned serially within a flow conduit such as a pipe. Mathematical equations are developed for each flow meter based upon measured quantities and phase flow rates within the liquid stream. These equations are then solved simultaneously to obtain the desired phase flow rates. Two flow meters are used to determine the gas and liquid flow rates. Alternately three flow meters are used to determine the flow rates of a gas and two liquid phases.

48 Claims, 10 Drawing Sheets

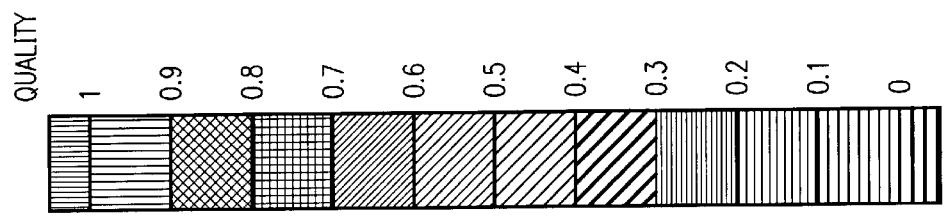
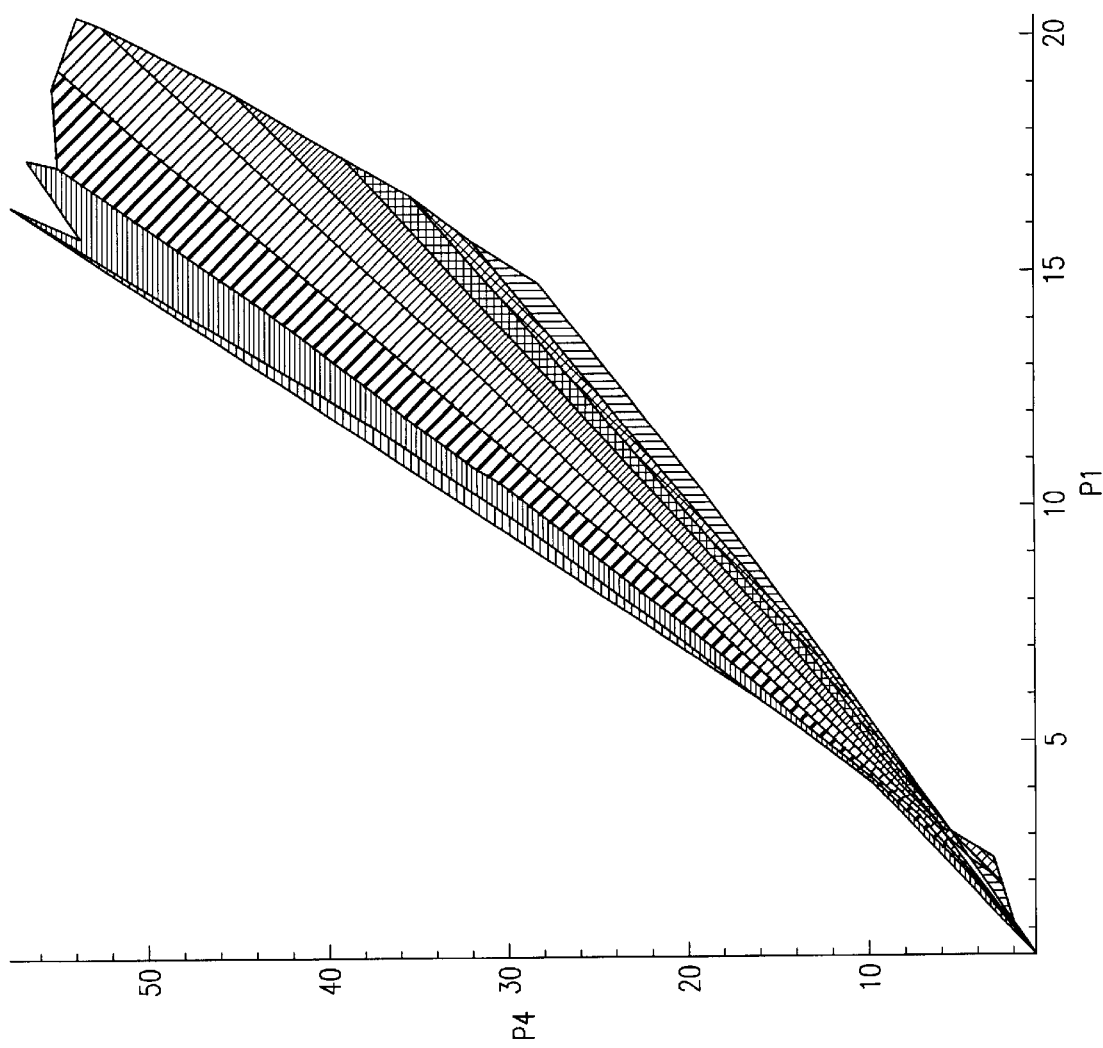
FIG. 6B

MULTIPLE-PHASE FLOW METER

RELATED APPLICATIONS

This application is a continuation-in-part application of U.S. patent application Ser. No. 09/151,253, filed on Sep. 10, 1998, entitled Multi-Phase Flow Meter, by Morrison, et al.

TECHNICAL FIELD OF THE INVENTION

This invention is related to flow meter instrumentation. More particularly, the invention is related to obstruction flow meters which are used in series in a flow conduit to determine the volume flow rate of liquid and gas phases of fluid flowing within the conduit.

BACKGROUND OF THE INVENTION

Fluid flow meters are used in many areas of industry and commerce. Various nuclear, acoustic, electromagnetic and mechanical techniques have been used to measure flow rate and volume flow rates of fluids containing one, two, or more components or "phases".

Obstruction type flow meters are widely used to measure single phase flow, such as fluids comprising 100% liquid or 100% gas. In orifice flow meters, fluid is forced to flow through an orifice in a plate within the flow conduit, creating a pressure drop across the plate. Orifice flow meters are relatively inexpensive to fabricate and maintain, and are reliable in many types of field operations. In addition, the physical size of most orifice devices is relatively small. Measurements of the differential pressure across the plate, along with fluid pressure and temperature measurements, are used to compute flow rate using equations well known in the art. Orifice flow measurements can be used to measure multiple-phase flow only if an independent measure of the ratio of the phases is made. Furthermore, accurate measurement of the volume flow rates of each phase can be obtained only if the linear flow velocities of the phases are the same, or the relative velocities or "slippage" of the linear phase flows can be determined, or all phases are forced to flow at the same linear flow rate at the position which the phase ratio and orifice plate measurements are made.

Positive displacement type flow meters force fluid to flow through a positive displacement meter such as a turbine apparatus, and the flow rate of the fluid is determined from the rate of revolution of the flow meter turbine. Positive displacement type flow meters may be used in multiple-phase flows. As with orifice flow meters, independent phase ratio measurements must be made using a variety of technologies, and assumptions must be made concerning the linear flow velocities of each of the phases in order to obtain accurate volume flow rates for the individual phases. Positive displacement type flow meters are more complex, more costly to manufacture and maintain, and are generally larger than orifice flow meters.

Separators are widely used in multiple-phase flow measurements. As an example, in the petroleum industry, it is of interest to measure volume flow rates of the three fluids produced: oil, gas and water. Gravity separators are widely used to separate these three components. The separated components are then drawn from the separator and single phase flow measurements are made on each of the separated components. Characteristically, separators are physically large, are expensive to construct, require a relatively long period of time for the multiple phases to separate by means of the force of gravity, and require separate flow meters and flow controllers for each separated phase.

Various two and three-phase "in-line" flow meters have been developed, especially in the petroleum industry. Relatively accurate three-phase "partition" measurements can be made using nuclear, acoustic, electromagnetic, and/or a combination of these technologies. However, a problem lies in accurately determining the flow velocities of each of the phases. Various relationships have been developed to calculate the relative or "slippage" velocity of two phases with respect to a measured third phase, but the calculations are replete with assumptions. In addition, these devices are usually quite complex both electronically and mechanically, are expensive to fabricate, and very expensive to maintain and calibrate.

Significant progress has been made recently in the area of single plate obstruction flow meters. U.S. Pat. No. 5,295,397 issued to Hall et al. on Mar. 22, 1994, and entitled "Slotted Orifice Flowmeter" ('397) discloses an orifice flow meter. The orifice plate is designed such that measurements are relatively insensitive to upstream and downstream flow conditions. In addition, this orifice plate is less disruptive in the manner in which it is used to impede flow. Therefore, fluid pressure recovers more readily within a shorter distance from the flow meter, and incurs less unrecoverable pressure drop than prior art orifice flow meters. Independent phase ratio measurements must be made, or assumptions directed toward the multiple phases must be made, in order to use the '397 device to measure volume flow rates in multiple-phase fluid flows. This patent is incorporated herein by reference.

U.S. Pat. No. 5,461,932 issued to Hall et al. on Oct. 31, 1995, and entitled "Slotted Orifice Flowmeter" ('932) discloses an orifice flow meter. A phase ratio sensor is used upstream from the orifice plate to allow two-phase flow measurements to be made without necessitating separation of the fluid. However, the phase ratio measurement is completely separate from the orifice flow meter measurement. This patent is incorporated herein by reference.

SUMMARY OF THE INVENTION

In one aspect of the present invention, a flow meter is provided for measuring the flow rate of each phase of a multiple-phase fluid in a conduit. Obstruction flow meters are serially positioned in a conduit and spaced a predetermined distance apart based upon the configuration of the orifice flow plate used in the obstruction flow meters. Sensors are also positioned in the conduit to measure the pressure and temperature of the multiple-phase fluid at various locations relative to the obstruction flow meters. The measurements are fed to a computer which calculates the flow rate of each phase of the multiple-phase fluid.

In another aspect of the present invention, a method is provided for measuring the flow rate of each phase of a multiple-phase fluid in a conduit. Obstruction flow meters are serially positioned in a conduit to create flow impedances. Pressures and the temperature of the multiple-phase fluid are measured at various locations relative to the obstruction flow meters. The measurements are then used to generate the flow rates of each phase of the multiple-phase fluid.

In another aspect of the present invention, a flow meter is provided for measuring a mixture of offshore petroleum products flowing in a conduit. Three obstruction flow meters are serially positioned in a conduit and spaced a predetermined distance apart based upon the configuration of the orifice flow plate used in the three obstruction flow meters. Sensors are also positioned in the conduit to measure the pressure and temperature of the mixture at various locations relative to the three obstruction flow meters. The measurements are fed to a computer which calculates the flow rate of each phase of the mixture. The flow rates are then stored in a memory device for future reference when determining royalty payments.

A primary technical advantage of the present invention is to provide multiple-phase flow measurements without the use of an independent phase ratio measurement.

Another primary technical advantage of the present invention is to provide a flow meter and a method for calculating more accurate values of the Reynolds number of the fluid and the "quality" of the gas from pressure, temperature and differential temperature measurements made in the vicinity of the obstruction flow meters.

An additional technical advantage of the present invention is to provide a reliable, relatively inexpensive, compact means for measuring multiple-phase flow which is compatible with instrumentation of single-phase orifice flow meters, thereby eliminating the necessity to employ exotic and/or expensive technologies such as sonic, nuclear, electromagnetic imaging, phase separation and the like to obtain multiple-phase measurements.

A still further technical advantage of the present invention is to provide a multiple-phase flow meter for offshore petroleum production operations where space on drilling and production platforms is at a premium, and reliability is of paramount importance.

Further advantages of the present invention may be appreciated upon examining the specification and claims below.

BRIEF DESCRIPTION OF THE DRAWINGS

For a better understanding of the present invention, reference may be made to the accompanying drawings, in which:

FIG. 6B is an exemplary quality contour plot as a function of P1 and P4;

DETAILED DESCRIPTION OF THE INVENTION

The preferred embodiment of the present invention and its advantages are best understood by referring to FIGS. 1–13 of the drawings, like numerals being used for like and corresponding parts of the various drawings. Various parameters associated with the obstruction flow meters will be identified with the subscripts i=1, 2, etc.

Figure 1:
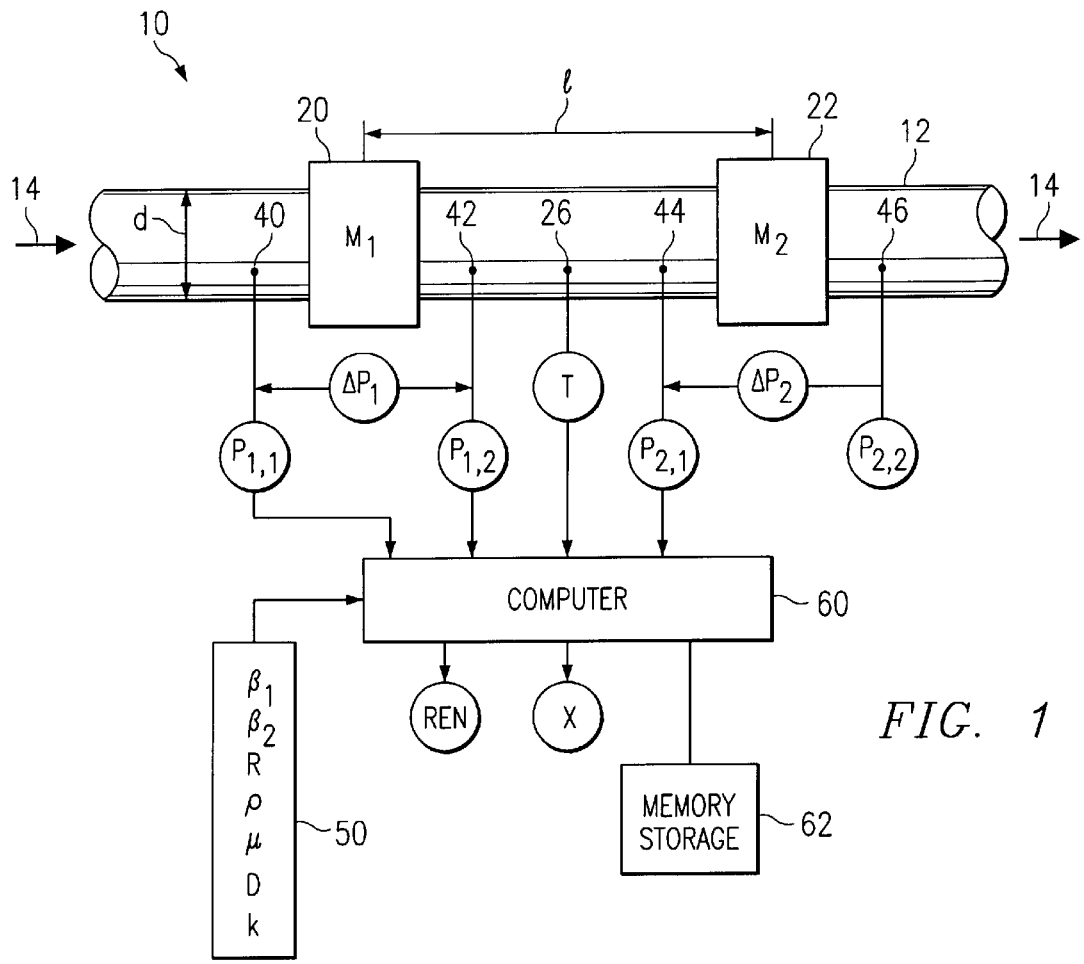
FIG. 1 is a schematic diagram of an embodiment of the present invention utilizing two obstruction flow meters serially disposed in a flow conduit.

With reference to the drawings, FIG. 1 is a schematic diagram of an embodiment of a multiple-phase flow meter 10 of the present invention. A fluid comprising a liquid phase and a gas phase flows through a cylindrical conduit 12, such as a pipe, in the direction indicated by arrows 14. The inside diameter of conduit 12 is denoted as the dimension d. Multiple-phase flow meter 10 includes a first flow meter 20 disposed in conduit 12, and is spaced a distance, 1, from a second flow meter 22 also disposed in conduit 12. The spacing, 1, is preferably several conduit diameters, d. At least one of the flow meters is an obstruction flow meter such as the type disclosed in U.S. Pat. Nos. 5,295,397 and 5,461,932, and may include a flow plate 30 of the type shown in FIG. 3.

Flow plate 30 is generally circular and contains a solid region 32. A series of spaced slots 34 are arranged on flow plate 30 to allow fluid to pass through. The ratio of the area of solid region 32 and the area of slots 34 is relatively constant over the entire flow plate 30. This ratio of areas is quantified by the term $\beta^2$. Flow plate 30 is positioned within conduit 12 such that the plane of flow plate 30 is substantially perpendicular to the major axis of conduit 12. The values, $\beta$, of obstruction flow meters 20 and 22 differ preferably by approximately 0.03 or more. As an example, typical beta values are $\beta_1=0.50$ for first obstruction flow meter 20 and $\beta_2=0.43$ for second obstruction flow meter 22, yielding a P difference of 0.07.

Still referring to FIG. 1, multiple-phase flow meter 10 further includes pressure sensors 40 and 42 which measure pressure upstream ($P_{1,1}$) and downstream ($P_{1,2}$), respectively, with respect to first obstruction flow meter 20. These pressure measurements are provided as input into a computer 60. In a similar fashion, pressure sensors 44 and 46 are disposed on either side of second obstruction flow meter 22 and measure pressure upstream ($P_{2,1}$) and downstream ($P_{2,2}$), respectively, with respect to second obstruction flow meter 22. These measured pressures are also input into computer 60. In addition, a temperature sensor 26 measures fluid temperature, T, which is also input into computer 60. Temperature sensor 26 may be positioned anywhere in the fluid flow.

Other parameters which are either known or obtained from independent measurements are symbolically shown in box 50 of FIG. 1. These include quantities $\rho$, $\mu$, k, D, R, $\beta_1$, $\beta_2$, and are defined below. These parameters are also input into computer 60. Once all measured and known parameters have been input into computer 60, the Reynolds number, Re, and the gas quality, x, are computed. Likewise, the flow rate of the gas and liquid phases are determined from the Reynolds number by computer 60. The details of the computation are set forth below. The calculated values may be output to a memory storage device 62, which may be a chart recorder or a digital recording device.

In an alternate embodiment of the present invention, with reference to FIG. 1, second obstruction flow meter 22 is omitted and replaced with a densitometer. The density measurement of a mixture of liquid and gas (of known density in the pure condition) enables solution of the term x. If that term is known, then the Reynolds number is extracted from a single set of data from first obstruction flow meter 20.

Figures 2, 3:
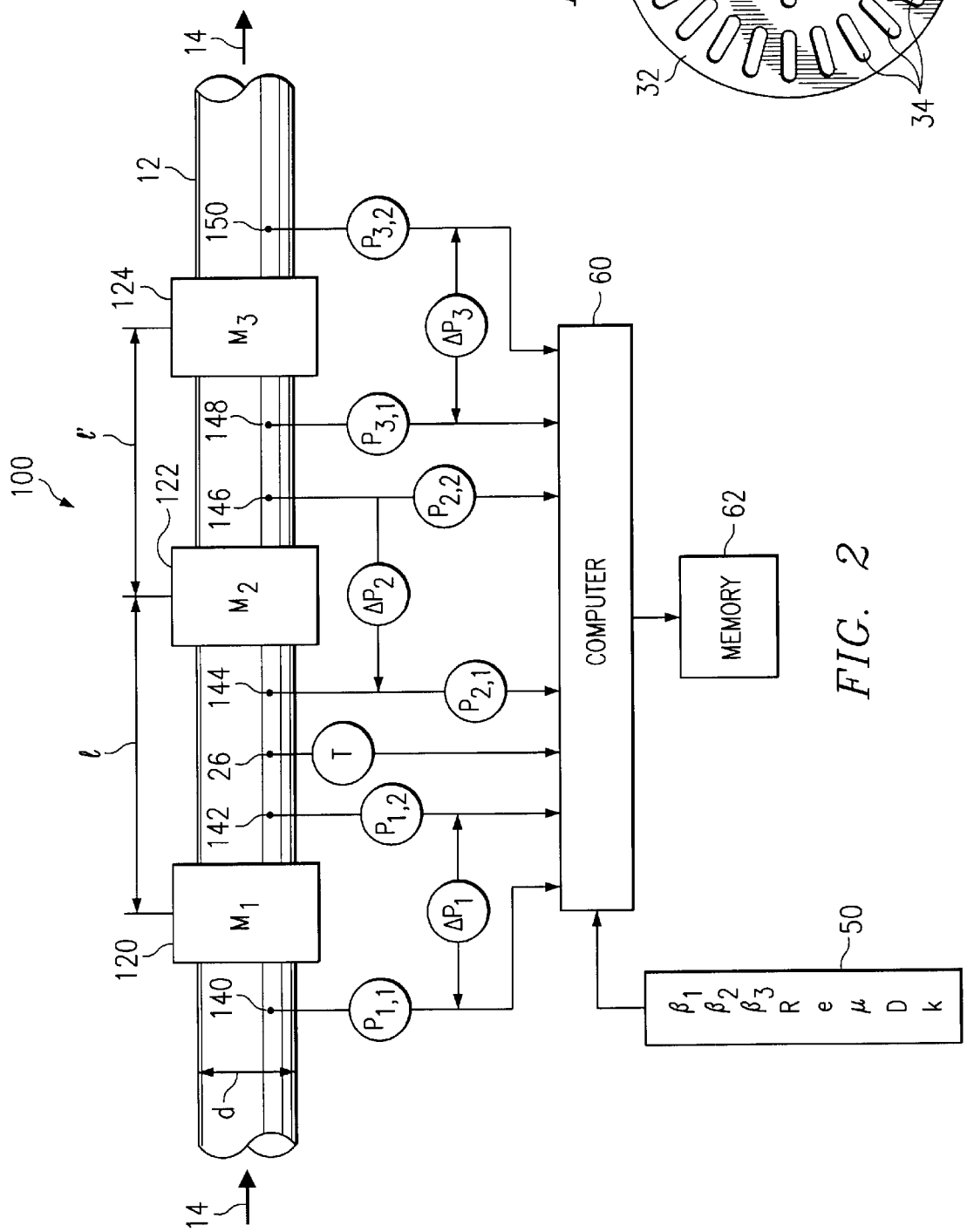
FIG. 2 is a schematic diagram of an embodiment of the present invention utilizing three obstruction flow meters serially disposed in a flow conduit.
FIG. 3 is a frontal view of a slotted orifice plate used in obstruction flow meters incorporated into the present invention.

The present invention is not limited to the measurement of the flow of two phases within a fluid. As an example, the present invention can be embodied to measure the phases of two liquids and a gas phase in the fluid, provided that the physical properties such as density and viscosity differ. With reference to the drawings, FIG. 2 is a schematic diagram of this embodiment of the present invention. A fluid comprising two liquid phases and a gas phase flows through cylindrical conduit 12 with inside diameter, d, in the direction indicated by arrows 14. Multiple-phase flow meter 100 includes a first obstruction flow meter 120 disposed in conduit 12, and is spaced a distance, l, from a second obstruction flow meter 122 also disposed in conduit 12. Second obstruction flow meter 122 is spaced a distance, l', from a third obstruction flow meter 124. The spacings, l and l', are preferably several conduit diameters, d. Obstruction flow meters 120, 122 and 124 may be of the type disclosed in U.S. Pat. Nos. 5,295,397 and 5,461,932, as discussed above.

In a preferred embodiment of the present invention, the spacing between the obstruction flow meters is equal to at least one diameter of the flow conduit, d. In a preferred embodiment of the present invention, the spacing between successive obstruction flow meters is between one pipe diameter and 12 pipe diameters. The spacing may be greater than 12 pipe diameters, however, the resultant size of the flow meter would render the device impracticable or impractical. In general, the spacing between the flow meters is such that, at a minimum, the upstream flow meter does not substantially alter the flow profile of the flow encountered by the downstream flow meter enough to degrade its performance, When the slotted obstruction flow meter shown in FIG. 3 is used, this spacing may be as small as one pipe diameter. In general, the maximum spacing between the flow meters is such that the percentage of flow constituents or components remains substantially the same from the upstream flow meter to the downstream flow meter.

Still referring to FIG. 2, multiple-phase flow meter 100 further includes pressure sensors 140 and 142 which measure pressure upstream ($P_{1,1}$) and downstream ($P_{1,2}$), respectively, with respect to first obstruction flow meter 120. These pressure measurements are provided as input into computer 60. Similarly, pressure sensors 144 and 146 are disposed on either side of second obstruction flow meter 122 and measure pressure upstream ($P_{2,1}$) and downstream ($P_{2,2}$), respectively, with respect to second obstruction flow meter 122. These measured pressures are also input into computer 60. In addition, pressure sensors 148 and 150 are disposed on either side of third obstruction flow meter 124 and measure pressure upstream ($P_{3,1}$) and downstream ($P_{3,2}$), respectively, with respect to third obstruction flow meter 124. These measured pressures are also input into computer 60. Also, a temperature sensor 26 measures fluid temperature, T, which is also input into computer 60.

Other parameters which are either known or obtained from independent measurements are symbolically shown in the box 50 of FIG. 2. These include quantities $\rho$, $\mu$, k, D, R, $\beta_1$, $\beta_2$, $\beta_3$ and are defined below. These parameters are also input into computer 60. Once all measured and known parameters have been input into computer 60, the Reynolds number, Re, and the gas quality, x, are computed for each phase. Likewise, the flow rate of the gas phase and two liquid phases are determined from the Reynolds number by computer 60.

The preferred obstruction flow meters are disclosed in the previously referenced U.S. Pat. Nos. 5,295,397 and 5,461,932. Among other attributes, the design of flow plate 30 generates flow characteristics of a fluid such that, after passing through a first obstruction flow meter, rapidly recover prior to passing through a second obstruction flow meter, with the exception of minimal nonrecoverable pressure drop. The flow characteristics are also very insensitive to upstream flow conditions. Because the obstruction flow meters of the present invention are disposed in series in conduit 12, the flow plates 30, with their superior fluid flow recovery properties and insensitivities to upstream flow conditions, can be spaced relatively close to minimize the overall dimensions of the multiple-phase flow meter of the present invention. Spacing of the obstruction flow meters is generally a few conduit diameters, d, apart.

Alternatively, other types of flow meters may be employed in the present invention so that only one or more flow meter is an obstruction-type flow meter. For example, vortex meters, Venturi meters, Coriolis meters and the like could replace the second and/or third flow meters in the series.

In a specific embodiment of the present invention, it will be observed that only N+1 pressure measurements are required, where N equals the number of obstruction flow meters. Using the two obstruction flow meter embodiment as an example, absolute pressure measurements may be made upstream of first obstruction flow meter 20, between first and second obstruction flow meters 20 and 22, and downstream of second obstruction flow meter 22. In an alternative approach, only one absolute pressure measurement need be made at any of the location of pressure sensors 40, 42, 44 or 46. Assume for purposes of discussion that pressure sensor 40 is the absolute pressure gauge. Then, two other pressure measurements are made and they can either be absolute measurements or can be differential pressure measurements. In either instance, the pressure drop is measured across first and second obstruction flow meters 20 and 22.

Recall that multiple-phase flow meter 10 of the present invention uses the response of obstruction flow meters operating in series to obtain the flow rate of a multiple-phase fluid. In the following mathematical description of the present invention, the subscript where i=1 and 2, will be used to identify various parameters associated with first obstruction flow meter 20 and second obstruction flow meter 22, respectively. These calculations are equally applicable to multiple-phase flow meter 100.

The Reynolds number, Re, of the gas portion of the fluid flowing through an obstruction type flow meter can be expressed as:

$$\text{Re} = f[C_{d,i}(x,\text{Re})Y_i D\beta_i^2 (2\rho_i \Delta P_i)^{1/2}]/[\mu(1\beta_i^4)]^{1/2} \quad (1)$$

where x = the gas quality;

$C_{d,i}$ = the discharge function;

D = the diameter of the conduit 12;

$\beta_i$ = square root of the ratio of the total open area of all openings divided by the cross-sectional area of the flow plate 30;

$\mu$ = the viscosity of the gas;

$\Delta P_i$ = the differential pressure drop across the ith obstruction flow meter;

$\rho_i = P_i/(R\ T)$; and $Y_i$ = expansion factor where $P_i$ = the absolute pressure in the flow stream in the vicinity of the obstruction flow meter i;

T = the temperature of the fluid;

R = the specific gas constant; and $k = C_p/C_v$ = the ratio of specific heats for the gas.

It has been determined that generalized functions $Cd_{,1}$ and $Cd_{,2}$, which are dependent upon Re and x, can be expressed as functions of selected constants with Re and x.

$$Cd_{,1} = f(a_1, b_1, c_1, d_1, Re, x); \text{ and} \quad (2)$$

$$Cd_{,2} = f(a_2, b_2, c_2, d_2, Re, x) \quad (3)$$

where the empirical constants are determined under known flow conditions for a particular configuration of flow plates 30. The quantities $\beta_i$ are known from the design parameters of the flow plates 30 of first and second obstruction flow meters 20 and 22. The quantities Yi are derived from metered calibrations. The quantities $\beta_i$ are calculated from measured quantities $P_{i,i}$, T, and from a known quantity R defined above. The quantity $\mu$ is also known as defined above. Therefore, the terms in Equation (1) are known with the exception of the Reynolds number of the fluid, Re, and the quality of the gas, x.

Equation (1) with i=1,2, may be solved iteratively for Re and x by starting with an initial guess of these quantities, as will be illustrated in a following example. The solution yields the Reynolds number of the gas and the quality of the gas/liquid mixture. A mass flow rate, m, of the gas can be calculated from the expression $$m = (Re \pi D \mu)/4 \quad (4)$$

Volume flow rates of the liquid and gas phases can then be obtained from m, x, and the densities of each phase.

The following known and measured parameters will be used to illustrate the determination of Re and x using the previously described methodology. $f_1(Re,x)$ and $f_2(Re,x)$ will represent discharge functions $C_{d,i}(Re,x)$ through series orifice plates i=1,2. This example was performed under known conditions in which the true values of Re and x were known. The measured and known parameters were:

$\rho H_2O = 62.4$ lb ft/sec² $\mu = 3.875\ 10^{-7}$ lbf sec/ft² k = 1.4

R = 53.35 ft lbf/lb deg $\beta_1 = 0.50$ $P_i = 24.2$ psi $\Delta P_1 = 9.83$ in of $H_2O$ $\rho_i = 0.123$ lb/ft³

$Y_1 = 0.995$ $a_1 = 2.3712846$ $b_1 = -4.9048095\ 10^{-7}$ $c_1 = 2.4594207$ $d_1 = 0.887817$

D = 2.067 in.

$\beta_2 = 0.43$ $P_2 = 14.5$ psi $\Delta P_2 = 19.21$ in. of $H_2O$ $\rho_2 = 0103$ lb/ft³

$Y_2 = 0.991$ $a_2 = 1.6272073$ $b_2 = -3.6012949\ 10^{-6}$ $c_2 = 1.1792148\ 10^{-11}$ $d_2 = -0.68470117$

Starting with initial values of Re=50,000 and x=0.5, the solution of Equation (1) converges at Re=5.46 $10^4$ and x=0.881. This compares quite favorably with the true values of Re=5.47 $10^4$ and x=0.8987, illustrating the accuracy and robustness of the present invention.

As a further illustration of the robustness and consistency of the present invention, the solutions Re and x are substituted into generalized Equations (2) and (3), expressed as discharge functions, to yield calculated discharge function values of:

$$C_{d,1} = a_1 + b_1 Re + c_1 x + d_1 x^2 = 0.869 \quad (5)$$

$$C_{d,2} = a_2 + b_2 Re + c_2 Re^2 + d_2 x = 0.863 \quad (6)$$

These calculated values compare favorably with experimental data of $C_{d,1} = 0.8498$ and $C_{d,2} = 0.8441$. Note the two equations are application specific and represent one type of analysis. Other constants can be developed for alternate specific forms of equations.

To put the foregoing into context, consider several oil wells which are drilled in a particular field. The wells usually flow a mixture of water, oil and gas. For purposes of discussion, assume the fluid flow consists only of oil and gas. It is not uncommon for the pressure in the producing formation to be sufficiently high so that the gas is dissolved in the oil. Therefore, the oil itself tends to carry the dissolved gas along as an adequate pressure is maintained, but the gas will come out of the oil depending on agitation, prevailing temperatures, pressure and other terms which are less significant than those. Moreover, as the field produces over a long interval of time, the ratio can change markedly. In other words, the amount of natural gas produced may change significantly over months or years. The total volumetric production will also change. For these reasons, it is important to know the relative mix of the two fluids (oil and natural gas).

Assume, therefore, that several wells are producing into a 6" diameter gathering line. Assume further that the production from the field must be measured and measurements transferred once each month for determination of royalties to be paid to the land owners. The royalties typically are given by a formula which provides different royalty rates for the produced natural gas and the oil, To accomplish this, memory storage device 62 is connected to computer 60 so that measurements can be output and stored for the month. These measurements will be distinctly more accurate than those that have been accepted in the industry in the past. It has been common in the industry to use a circular paper disk connected with a clock so that the line marked on the disk represents the flow for one revolution of the disk. The disk is normally rotated once per day, once per week, or once per month. The disk must be serviced to avoid marking a second line over the first line; this requires disk removal at the end of one disk interval of time (i.e., one disk is assigned to each day, week or month). That requires the difficulty of servicing in the field. The old disk is removed and taken to a measuring facility where the area under the curve is measured, thereby representing the integrated flow through that particular measuring device for that time interval. That is represented as so many barrels of oil in a week, or so many standard cubic feet of natural gas in a time interval such as a week.

As will be seen, an easily implemented set of measurements (only pressure and temperature) may be used in determining the flow of the oil and gas. This flow through the gathering line can be output to memory storage device 62, and that memory can be interrogated daily, weekly or monthly as required.

The present invention operates most efficiently when the percent of liquid in the fluid is in the 0–80% range. For liquid content above 80%, "slugs" of 100% liquid tend to flow within the pipeline, especially if the pipeline undulates with terrain. Low points in the pipeline can act as liquid traps and thereby create the liquid slugs. Liquid slugs can damage flow meters, especially if the linear flow velocity of the slugs is large. Such slugging derives from the fluid context and does not indicate any defect of the present system. When the liquid content is sufficiently large that slugging no longer occurs (such a bubbly flow), the present invention will operate properly and with high accuracy.

Referring to the two obstruction flow meter embodiment, relationships can be developed which are dependent on four variables: T, P, $\Delta P_1$ and $\Delta P_2$. More specifically in observing only first obstruction flow meter 20, it will be understood that an equation of the generalized form can be developed. Two such equations are given because there are two obstruction flow meters; these are generally set forth in the form of equations (7) and (8):

$$C_{d,1} = f_1(T, P, \Delta P_1 \text{ and } \Delta P_2) \tag{7}$$

$$C_{d,2} = f_2(T, P, \Delta P_1 \text{ and } \Delta P_2) \tag{8}$$

These functional equations can then be viewed simply as two equations dealing with two unknowns and are solved to obtain solutions which are robust and consistent over a reasonable range of product flow through the two obstruction flow meters. As a practical matter, the two obstruction flow meters can thus provide measurements based upon four measured variables (T, P, and $\Delta P_1$ and $\Delta P_2$). As will be understood, the development shown in equations (7) and (8) represents a more generalized case than that of equations (2) and (3). This suggests significant benefits and advantages in viewing the system in this manner. The precise nature of the functional relationship given in equations (7) and (8) can be that which was developed earlier but other empirical relationships can likewise be developed for use as equations (7) and (8).

Referring to the three obstruction flow meter embodiment, relationships can be developed which are dependent on five variables: T, P, $\Delta P_1$, $\Delta P_2$ and $\Delta P_3$. The system can be generalized mathematically as three equations of the form $$C_{d,1} = f_1(T, P, \Delta P_1, \Delta P_2, \Delta P_3) \tag{9}$$

$$C_{d,2} = f_2(T, P, \Delta P_1, \Delta P_2, \Delta P_3) \tag{10}$$

$$C_{d,3} = f_3(T, P, \Delta P_1, \Delta P_2, \Delta P_3) \tag{11}$$

where the subscripts i=1,2,3, represent first, second and third obstruction flow meters 120, 122 and 124. These equations, and the simultaneous solutions for three unknowns (e.g., oil, water and gas flow) are analogous to the two obstruction flow meter embodiments discussed previously and expressed mathematically in generalized equations (7) and (8). Solutions for the oil, water and gas phases are possible because the physical properties of each phase, such as the density and viscosity, differ, and therefore result in distinctive responses in each of obstruction flow meters 120, 122 and 124. The simultaneous solution of Equations (9) through (11) is obtained using computer 60. These equations are effective for volumetric quantification and are also effective for mass flow rate.

The flow calculation algorithm for the slotted orifice flow meter was investigated to determine how accurate two-phase flow meter calibration curves can be obtained. These techniques can be extended to multiphase applications using similar approaches. The first technique uses the standard orifice flow meter flow equation. This standard orifice flow meter flow equation is given by:

$$\dot{m} = KY \frac{\pi}{4} d^2 \sqrt{2\rho \Delta P}$$

where,
$\dot{m}$=total mass flow rate,
K=flow coefficient,
Y=expansion factor,
d=orifice diameter=$\beta$D,
D=pipe diameter,
$\rho$=density of gas, liquid, or mixture,
$\Delta P$=pressure drop across orifice plate.

Data obtained for an air-water flow was analyzed to determine values of slotted orifice discharge coefficients (KY). For this analysis, the previous equation was rearranged and the product KY was calculated by using either the density of the gas, liquid, or a mixture, and the total mass flow rate observed in the flow. The air density was calculated using the pressure and temperature in the pipe. The flow quality (X) based upon mass and the total flow rate (M) are defined by:

$$M = \dot{m}_{mixture} = \dot{m}_{air} \dot{m}_{water}$$

and $$x = \frac{\dot{m}_{air}}{\dot{m}_{air} + \dot{m}_{water}} = \frac{\dot{m}_{air}}{M}$$

Figure 4:
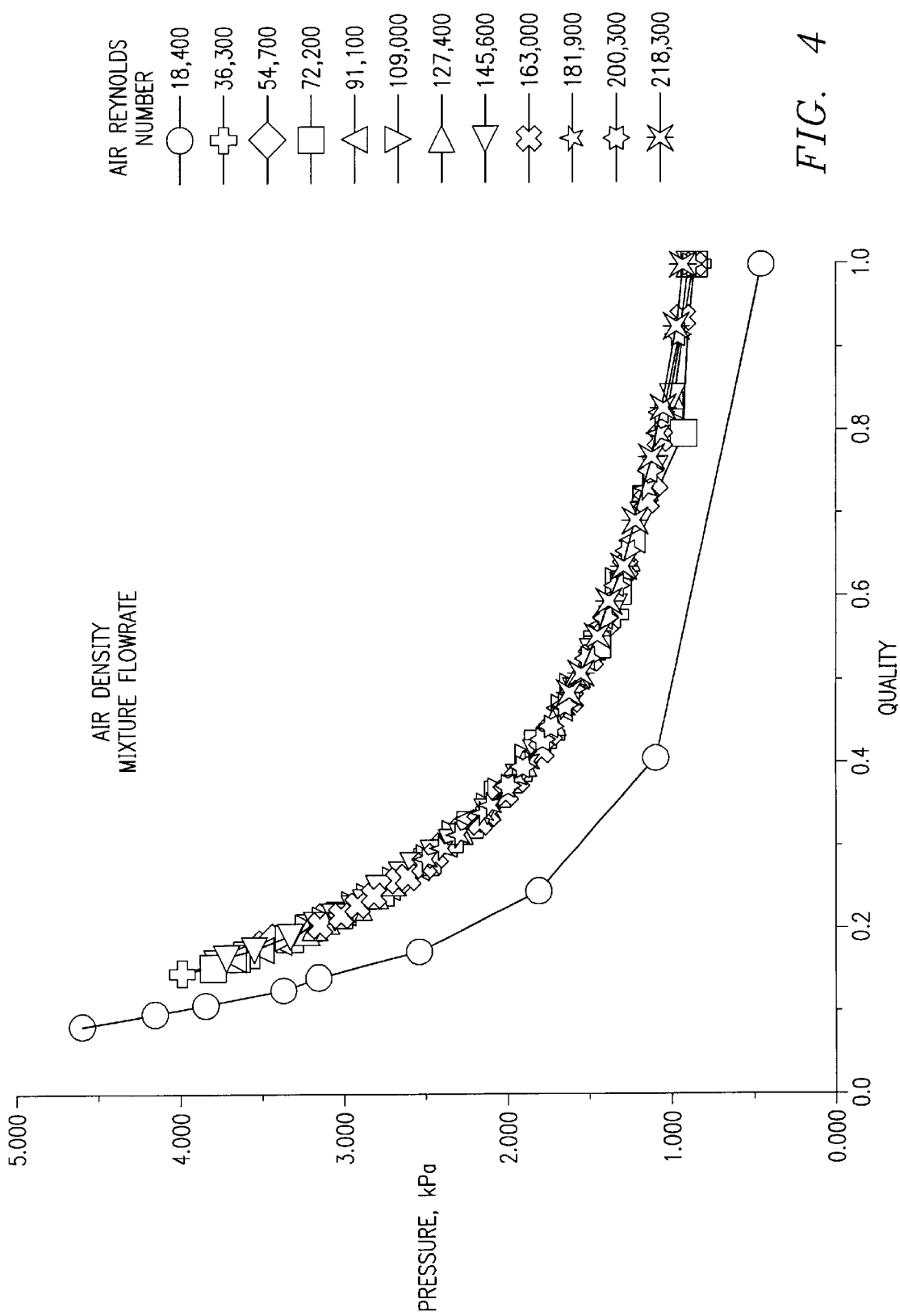
FIG. 4 is an exemplary plot of slotted orifice discharge coefficient variation with quality, 289 kPa line pressure, $\beta=0.50$, pressure tap 1, mixture flow rate, air density.
Figure 5:
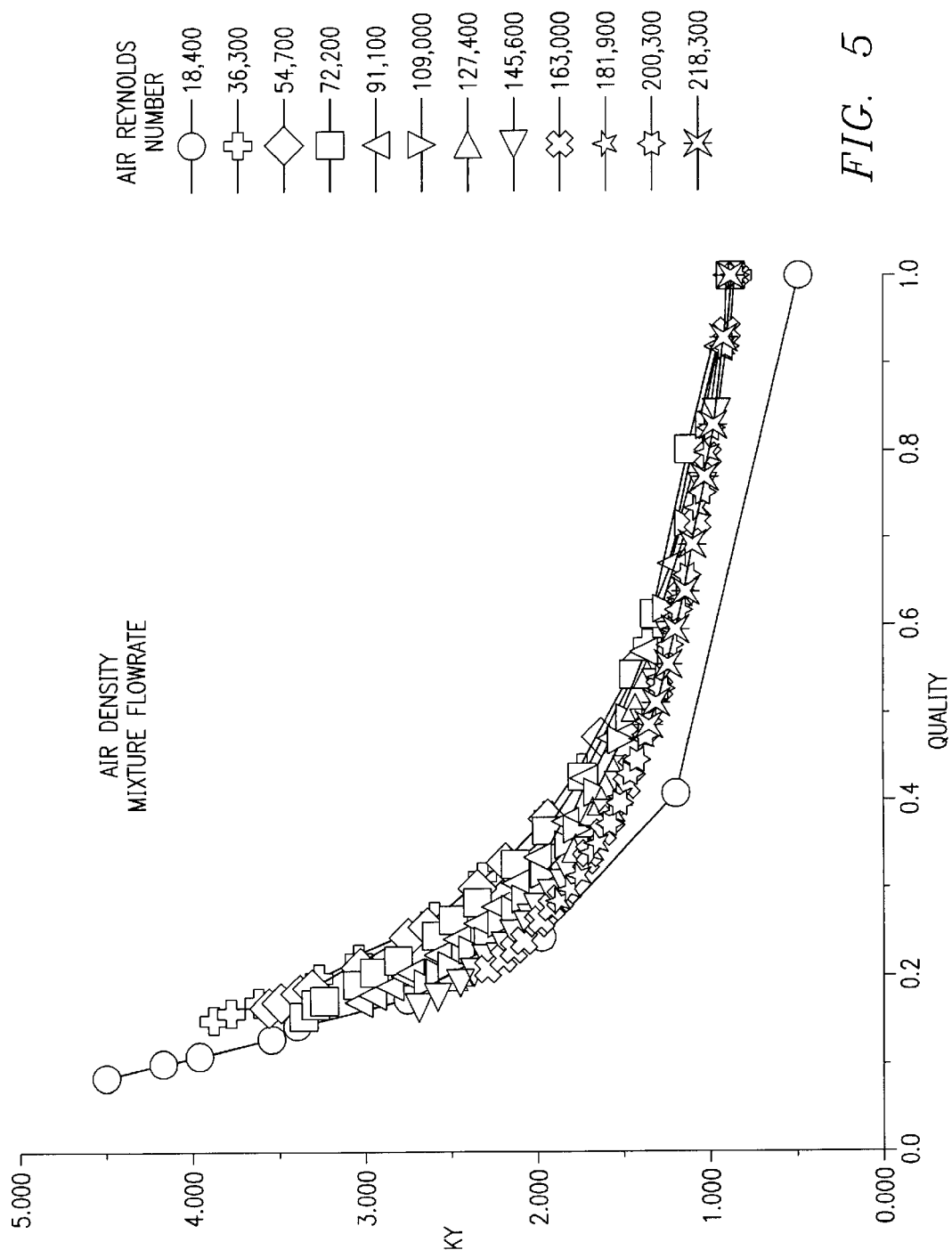
FIG. 5 is an exemplary plot of slotted orifice discharge coefficient variation with quality, 289 kPa line pressure, $\beta=0.43$, pressure tap 4, mixture flow rate, air density.

Exemplary KY values computed using the mixture flow rate and the air density are shown in the FIGS. 4 and 5 for two different slotted orifice plates, $\beta$=0.50 and $\beta$=0.43 respectively. The $\beta$=0.50 slotted orifice plate responded very well to the two-phase flow. It may be noted that the KY values are independent of air Reynolds numbers. Only the Re=18,400 data does not collapse to the common curve. This is due to the very small pressure differentials produced at this low Reynolds number resulting in very large uncertainties in the measurements. The $\beta$=0.43 slotted orifice plate follows the same trends but there is an air Reynolds number dependence, where discharge coefficient, KY, decreases with increasing air Reynolds number. This variation is consistent with a compressibility effect where expansion factor, Y, decreases as with increasing pressure drop across the slotted orifice plate. This is the same type of variation in Y as observed in standard orifice flow meters. By fitting curves for these discharge coefficients, it is possible to solve for the mixture flow rate and quality by solving the two orifice flow equations (one for each orifice plate) simultaneously.

Figure 6A:
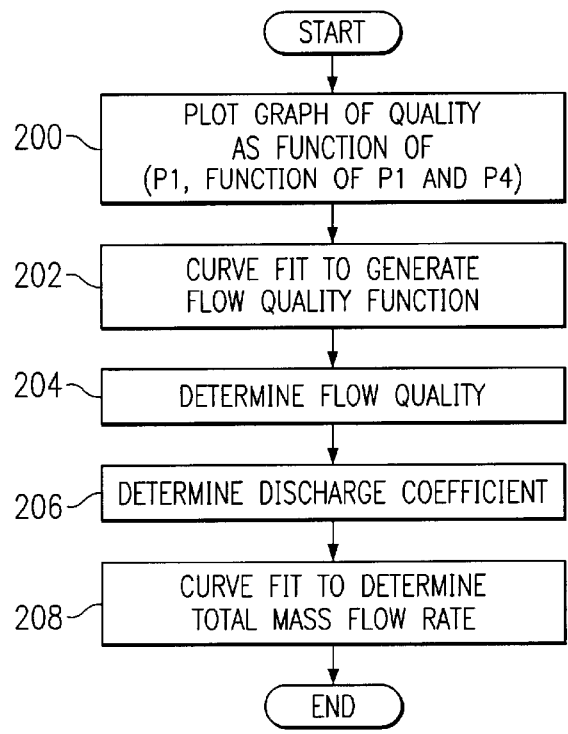
FIG. 6A is a flowchart of an embodiment of a method to determine the total mass flow rate and quality according to the teachings of the present invention.

A second technique for obtaining the mass flow rate and quality is shown in FIG. 6A and based on an exemplary plot shown in FIG. 6B. In block 200 (FIG. 6A), a contour plot of quality as a function of the pressure differential measured across the two slotted orifice plates, P1 and P4 is obtained. This surface contour can be curve fit to produce a function where the measured values of the pressure drop across two slotted orifice plates can be used to directly calculate the quality of the flow mixture, as shown in blocks 202 and 204. In block 206, once the quality is determined, the discharge coefficient, KY, can be obtained from FIG. 4, which is only dependent upon the mixture quality. Finally, given the flow quality and one of the flow meter's discharge coefficients, the total mass flow rate can be calculated, as shown in block 208.

Figure 7:
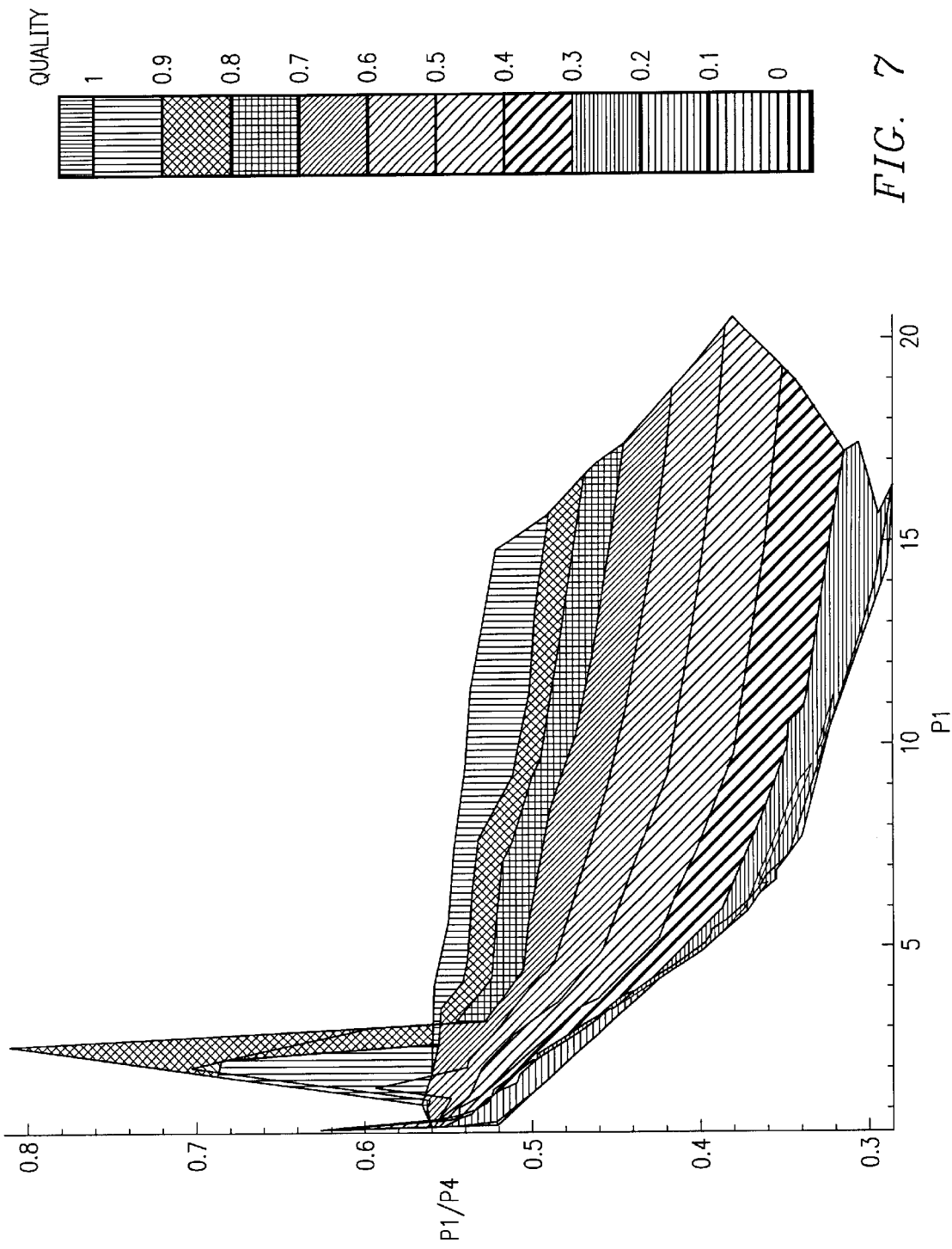
FIG. 7 is an exemplary quality contour plot as a function of P1 and P1/P4.
Figure 8:
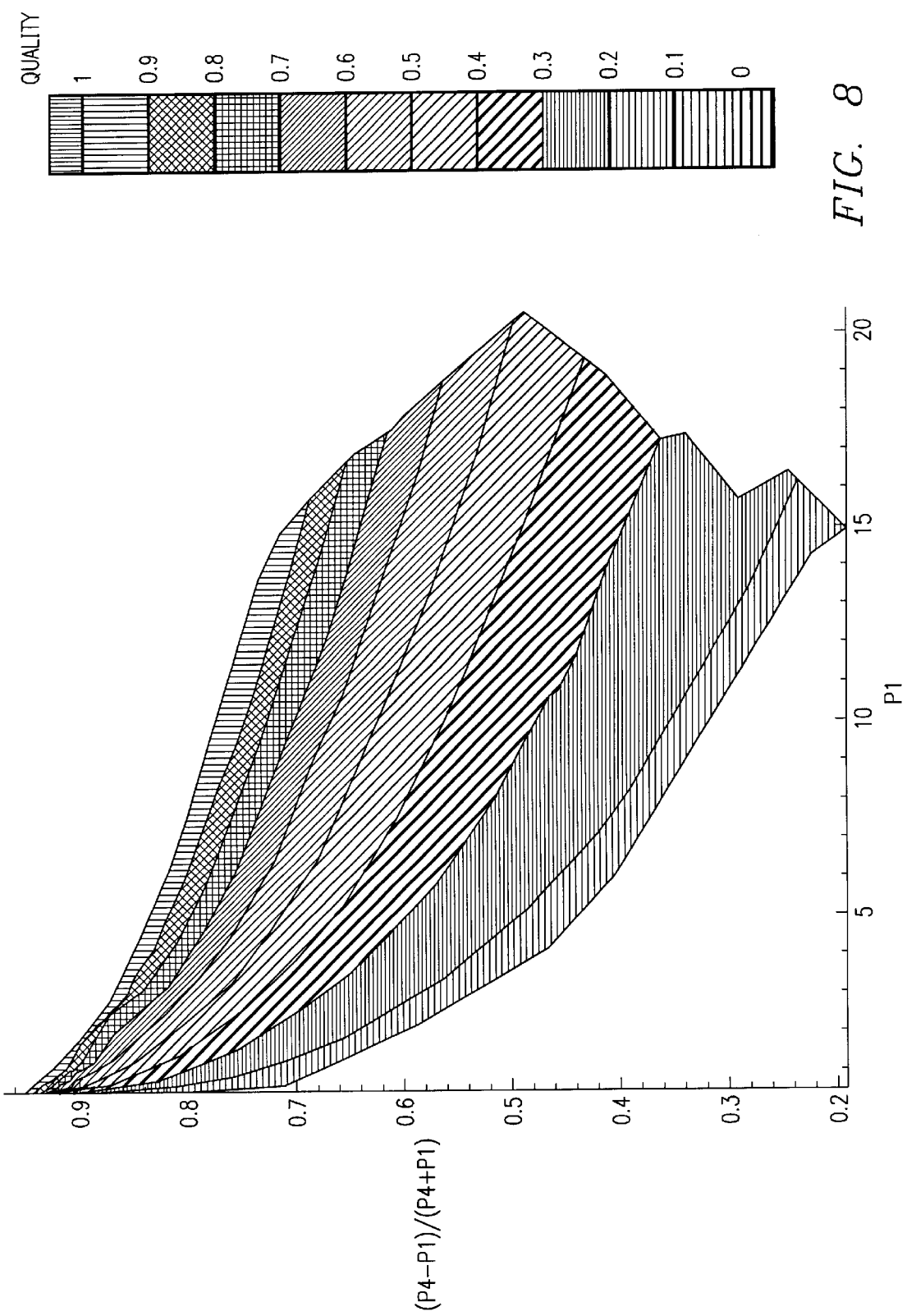
FIG. 8 is an exemplary quality contour plot as a function of P1 and (P4−P1)/(P4+P1)

The third and fourth techniques were developed due to the rapid variation of quality with respect to P1 and P4 as shown in FIGS. 6A and 6B. Various combinations of P1 and P4 were considered and two alternatives which greatly increase the accuracy of the flow computation were identified. FIGS. 7 and 8 are exemplary plots that present the graphical information. By using a function of P1 and P4, such as the ratio of P1/P4 or a functional combination of (P4−P1)/(P4+P1), the rapid variation of quality with the measured pressure differences is reduced. FIG. 7 illustrates a problem with the data for P1<4 kPa with the large spike appearing in the plot. This spike is due to large uncertainties in the measured pressures at these low values. Full scale of the pressure transducer is 62 kPa. Therefore, pressures below 6 kPa have unacceptably high uncertainty. The difference-sum ratio does not exhibit this problem and may be the ultimate preferred technique.

Figure 9:
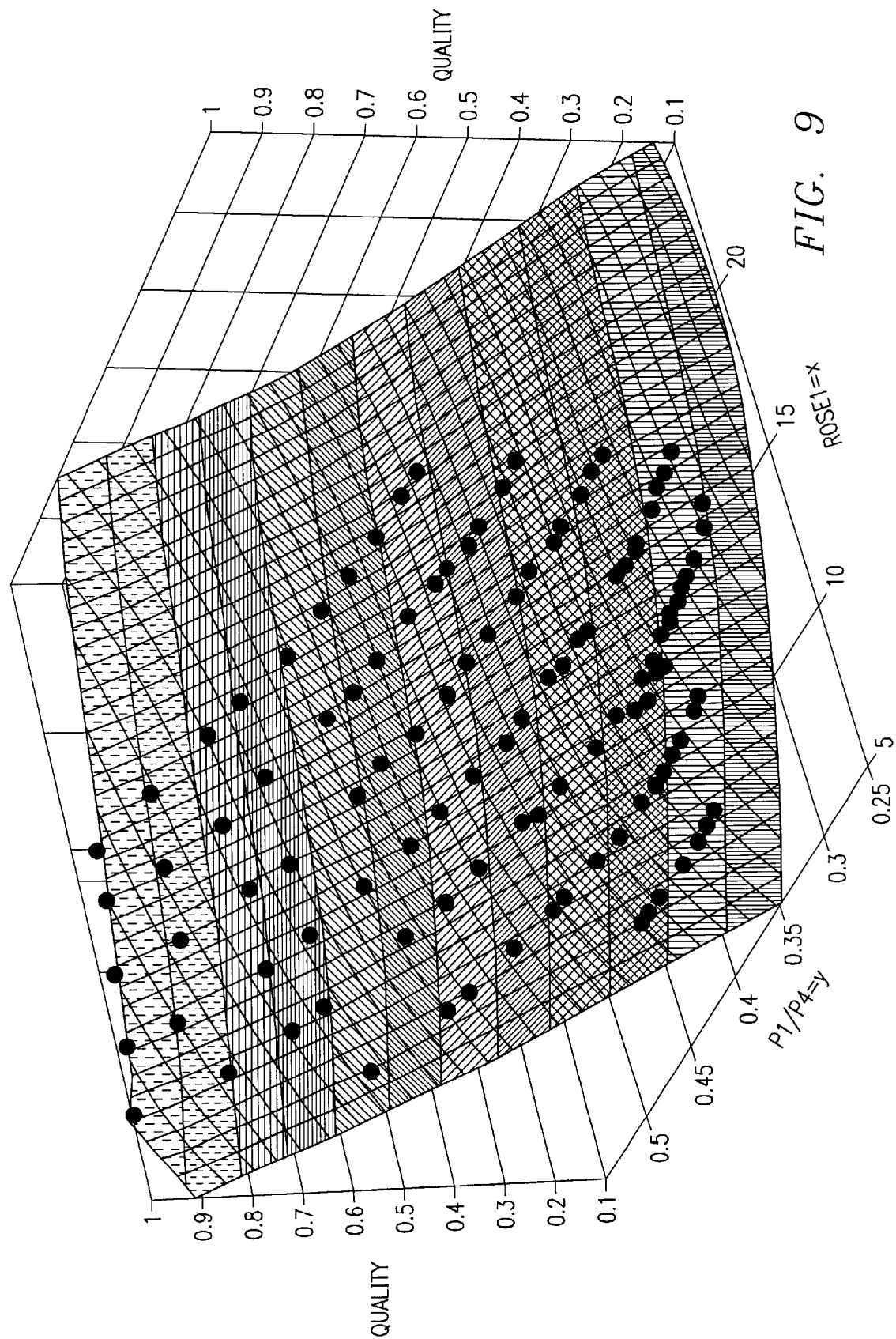
FIG. 9 is an exemplary three dimensional curve fit of flow quality as a function of the $\beta=0.50$ slotted orifice pressure differential and the ratio of the $\beta=0.50$ to 0.43 slotted orifice pressure differential.
Figure 10:
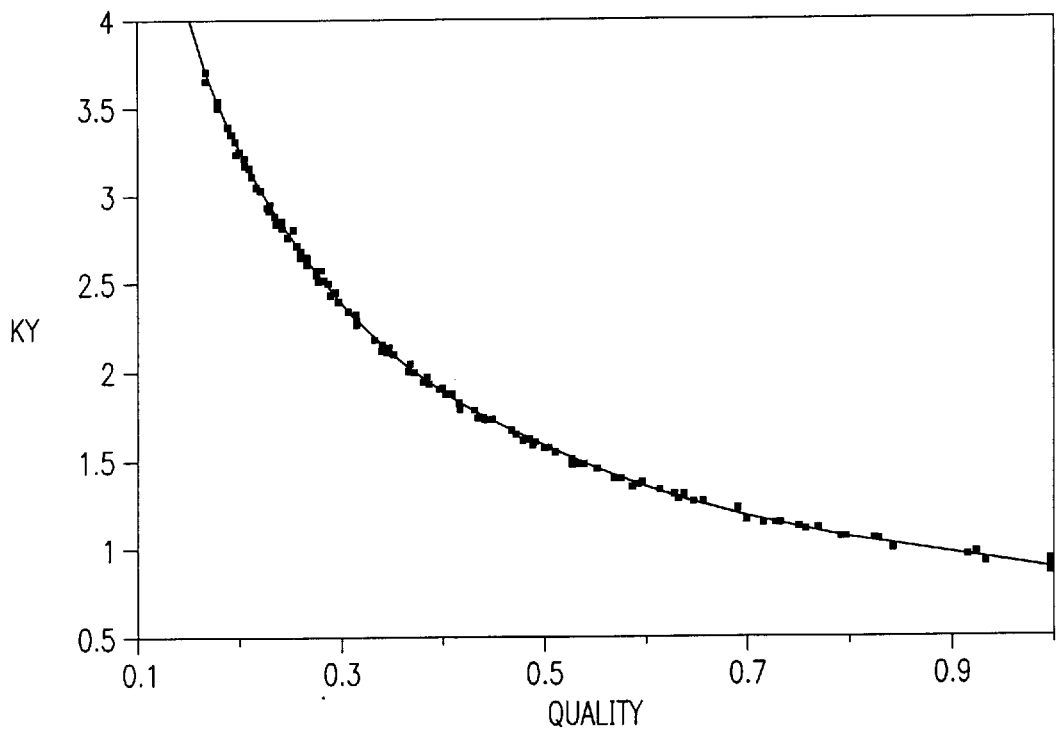
FIG. 10 is an exemplary slotted orifice discharge coefficient curve fit for mixture mass flow rate, air density, and all air Reynolds numbers with slotted orifice $\Delta$Ps larger than 5 kPa as a function of flow quality.
Figure 11:
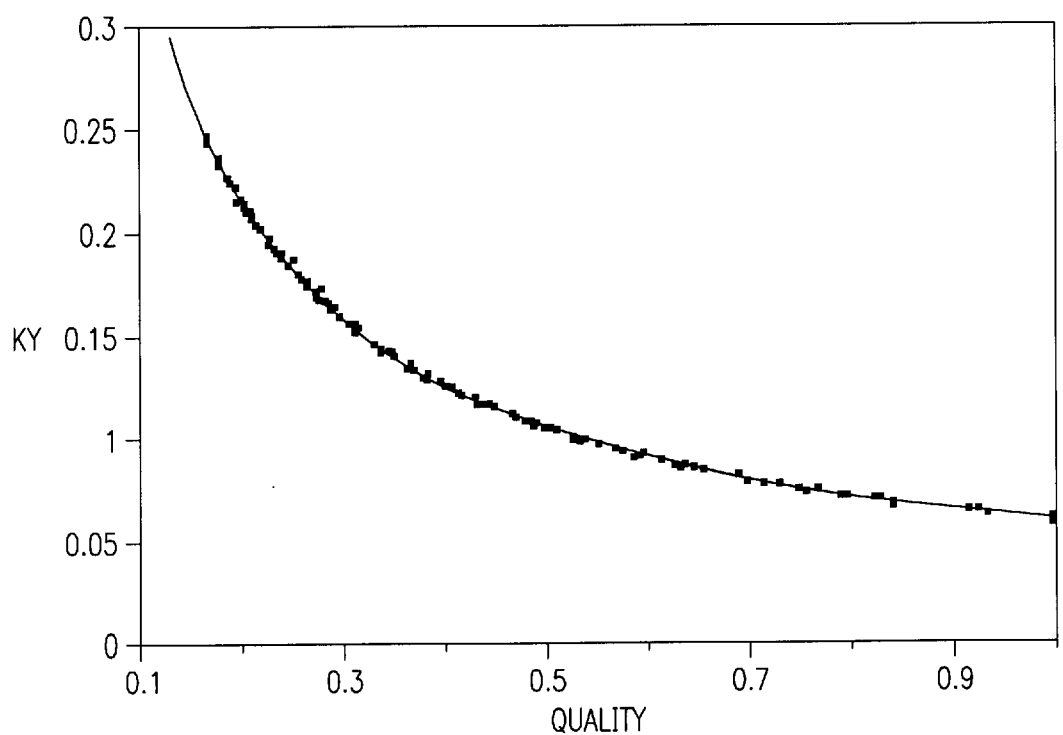
FIG. 11 is an exemplary slotted orifice discharge coefficient curve fit for mixture mass flow rate, water density, and all air Reynolds numbers with slotted orifice $\Delta$Ps larger than 5 kPa as a function of flow quality.

Using the data presentation in FIG. 7, the flow measurement calculation can be based upon exemplary calibration curves shown in FIGS. 9 to 11. The quality is calculated directly from the two pressure differentials, P1 and P4, measured across the β=0.50 and 0.43 slotted orifice plates, respectively. The contour plots (FIG. 6) showed that using P1 and P4 directly result in very large uncertainties at low pressures since the contour plot shows a very large gradient in X for very small changes in P1 and P4. FIG. 7 shows how representing X(P1, P1/P4) spreads the contours out over a larger area which results in a more accurate calculation of X. An exemplary curve fit of these data is shown in FIG. 9 and has a goodness of fit of 0.99687. The equation shown in FIG. 9 is used to calculate the quality of the flow. The total mass flow rate is then calculated using the orifice flow equation for the β=0.50 slotted orifice plate using either the density of the gas or liquid (FIGS. 10 and 11) since the values of KY were independent of air Reynolds numbers for the data having P1>6 kPa. Both the air and water density curves were fit and are shown. Both curve fits have goodness of fit values greater than 0.999. Subsequent analysis showed there was no difference in the accuracy of the mass flow rate calculation between the air and water density based calculation.

The actual experimental values of P1 and P4 were used in the following equations along with the air density calculated from the downstream pressure and temperature to calculate the quality and total mass flow rate:

$$xcalc\left(P_1, \frac{P_1}{P_4}\right) = a + bP_1 + c\ln\left[\frac{P_1}{P_4}\right] + dP_1^2 + e\left(\ln\left[\frac{P_1}{P_4}\right]\right)^2 +$$

-continued
$$fP_1\ln\left[\frac{P_1}{P_4}\right] + gP_1^3 + h\left(\ln\left[\frac{P_1}{P_4}\right]\right)^3 + iP_1\left(\ln\left[\frac{P_1}{P_4}\right]\right)^2 + jP_1^2\ln\left[\frac{P_1}{P_4}\right]$$

$$KY(xcalc) = A + B\frac{\ln[xcalc]}{xcalc}$$

and $$Mcalc = \dot{m}_{mixture} = KY(xcalc)\frac{\pi}{4}d^2\sqrt{2\rho_{air}P_1}$$

Figure 12:
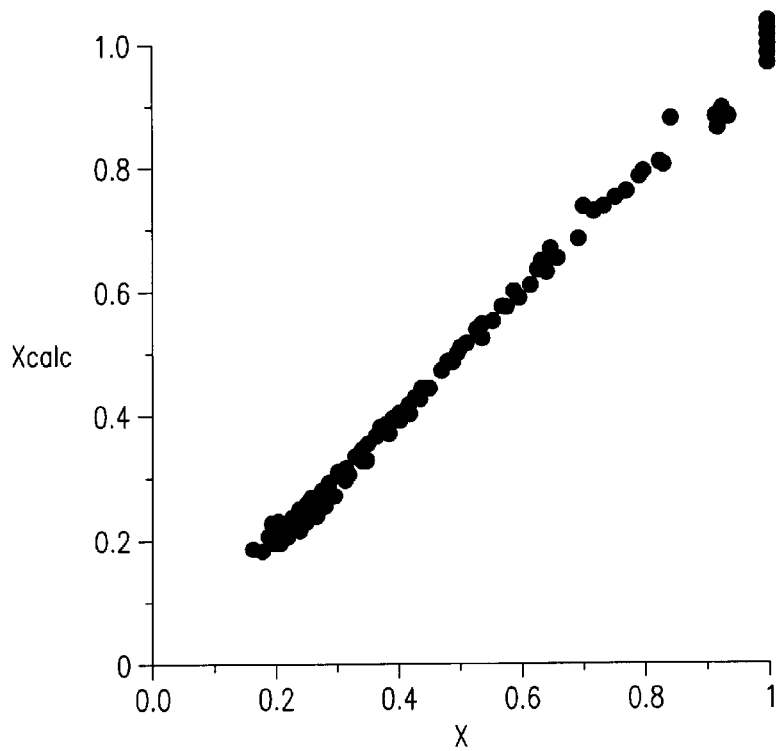
FIG. 12 is an exemplary plot of comparison and calculated and measured quality, 289 kPa line pressure.
Figure 13:
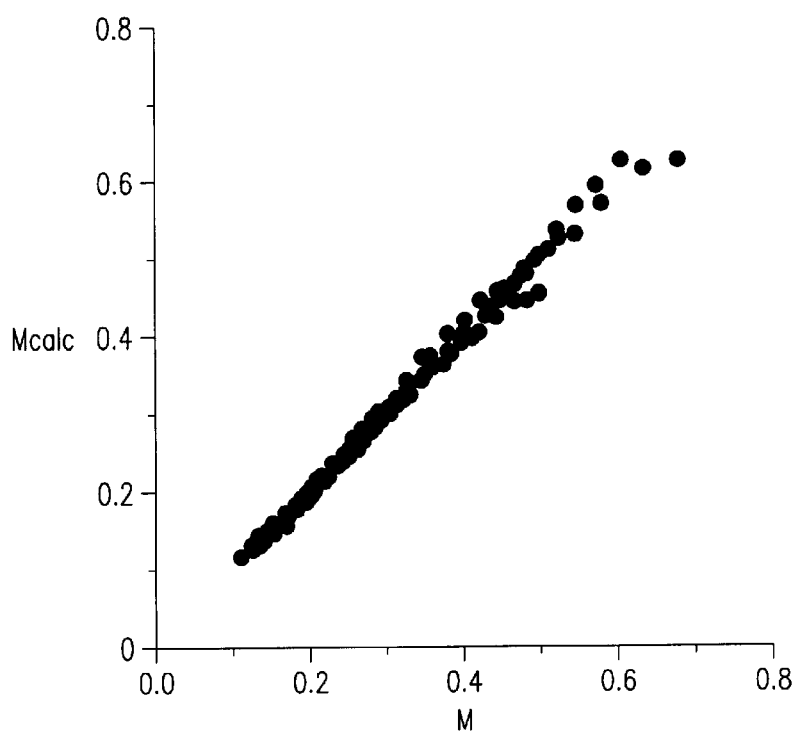
FIG. 13 is an exemplary plot of comparison and calculated and measured mixture mass flow rate, 289 kPa line pressure.

Exemplary results are shown in FIGS. 12 and 13. The calculated values follow the measured values very well. To quantify the goodness of the calculation, the ratio of the calculated value divided by the measured value were computed. For the ratio Xcalc/X, the mean is 1.001 and the standard deviation is 0.023. Therefore, on the average, the quality is calculated to within 0.1% of the true value with a standard deviation of 2.3%. The mixture accuracy is similar with a mean of 1.003 and a standard deviation of 0.017 which translates to calculated mass flow rate error of 0.3% with a standard deviation of 1.7%. These results indicate a meter which is highly accurate. The magnitude of the standard deviation can be reduced by decreasing the uncertainty in the pressure measurements. The errors in the calculations appear to be random since the mean has a very low uncertainty. Replacing X(P1, P1/P4) with a curve fit of X(P1, {P4−P1}/{P4+P1}) may provide an increase in accuracy since the low pressure accuracy problem is not apparent in FIG. 8 and the surface area of the graph has increased resulting is less sensitivity of the calculated quality to minor variations or errors in the measured values of P1 and P4.

The method above may be extended to a three-phase solution. A third flow meter is disposed in series with the above-described two flow meters to measure a third pressure differential, P3. Using three pressure differentials (P1, P2, P3), a four-dimensional curve fit is used to produce an equation for flow quality, X, as a function of P1, P2, P3. This function may involve combination functions of P1, P2, P3. (Note in the previous discussion the second pressure differential is denoted as P4.) From the operating flow meter, measurements P1, P2 and P3, are obtained and flow quality, X(P1, P2, P3) is calculated, where quality is given by:

$$x = \frac{\dot{m}_{gas}}{\dot{m}_{total}}$$

A curve fit of the total mass flow rate as a function of P1, P2 and P3 is given by:

$$\dot{m}_{total}(P1, P2, P3)$$

Similar to the two-phase solution described above, from the flow quality value and discharge coefficient, the total mass flow rate of the gas and of the liquid mixture can be calculated. Next, the mass flow rates of the two individual liquid components in the liquid mixture are determined. Knowing the total mass flow rate of the gas and of the sum of the two liquid components, γ is defined as the ratio:

$$\gamma = \frac{\dot{m}_{liquid1}}{\dot{m}_{liquid1} + \dot{m}_{liquid2}} = \frac{\dot{m}_{liquid1}}{\dot{m}_{liquid}}$$

Further definitions are:

$$x = \frac{\dot{m}_{gas}}{\dot{m}_{gas} + \dot{m}_{liquid}}$$

$$\dot{m}_{total} = \dot{m}_{gas} + \dot{m}_{liquid} = \dot{m}_{gas} + \dot{m}_{liquid1} + \dot{m}_{liquid2}$$

$$\rho_{liquid} = (1-\gamma)\rho_{liquid1} + \gamma\rho_{liquid2}$$

The density of the liquid mixture $\rho_{liquid}$ can be obtained from a curve fit of $\rho_{liquid}$ as a function of P1, P2 and P3. Once the density of the liquid mixture is known, then the value of γ tan be calculated and used to determine the mass flow rate of the two liquid components. It is noted that the present invention is adaptable to flow having three or more phases using similar techniques as described above.

In an embodiment of the present invention, the preferred thickness of the flow meter slotted orifice plate is 4 to 8 times the width of the slots. If swirl is absent from the flow, 4 slot widths are sufficient; if swirl is present, 8 slot widths are sufficient to eliminate use of a flow straightener. With this preferred thickness, upstream flow straighteners or conditioners are not needed.

While the foregoing disclosure is directed to specific embodiments of the present invention, other and further embodiments of the invention may be devised without departing from the basic scope thereof, and the scope thereof is determined by the claims which follow.

What is claimed is:

1. A multiple-phase flow meter for measuring a multiple-phase flow in a conduit, comprising:

at least two flow meters including at least one obstruction flow meter serially disposed in the conduit so that the at least two flow meters each having an upstream side and a downstream side, and any two adjacent flow meters have an intermediate region therebetween, the at least two flow meters being spaced at a minimum such that the downstream flow meter encounters little of the flow profile distortion caused by the upstream flow meter so that the performance of the downstream flow meter is not substantially degraded, and spaced at a maximum such that a percentage of flow constituents remains substantially the game from the upstream flow meter to the downstream flow meter;

a plurality of sensors located upstream, downstream, and in the intermediate region of the at least N flow meters, the plurality of sensors measuring predetermined characteristics of the multi-phase flow; and a processor coupled to the plurality of sensors and capable of computing a total mass flow rate of the multiple-phase flow by computing a quality of the multiple-phase flow based on the measured predetermined characteristics.

2. The multiple-phase flow meter of claim 1 wherein the processor is capable of computing quality and total mass flow rate of the multiple-phase flow by:

x=xcalc(P1, P4)

such as:

$$xcalc(P_1, P_4) = a + bP_1 + c\ln\left[\frac{P_1}{P_4}\right] + dP_1^2 + e\left(\ln\left[\frac{P_1}{P_4}\right]\right)^2 +$$

-continued
$$fP_1\ln\left[\frac{P_1}{P_4}\right] + gP_1^3 + h\left(\ln\left[\frac{P_1}{P_4}\right]\right)^3 + iP_1\left(\ln\left[\frac{P_1}{P_4}\right]\right)^2 + jP_1^2\ln\left[\frac{P_1}{P_4}\right]$$

$$KY(xcalc) = A + B\frac{\ln[xcalc]}{xcalc}$$

and $$Mcalc = \dot{m}_{mixture} = KY(xcalc)\frac{\pi}{4}d^2\sqrt{2\rho_{air}P_1}$$

where, $\dot{m}$=total mass flow rate, $$\dot{m} = KY\frac{\pi}{4}d^2\sqrt{2\rho\Delta P},$$

K=flow coefficient,
Y=expansion factor,
d=orifice diameter=βD,
D=pipe diameter,
ρ=density of gas, liquid, or mixture,
ΔP=pressure drop across orifice plate,
P1, P4=pressure differential measured across the two plates, $$M = \dot{m}_{mixture} = \dot{m}_{air} + \dot{m}_{water},$$

and $$x = \frac{\dot{m}_{air}}{\dot{m}_{air} + \dot{m}_{water}} = \frac{\dot{m}_{air}}{M}.$$

3. The multiple-phase flow meter of claim wherein the processor is capable of computing quality and total mass flow rate of the multiple-phase flow by:

x=xcalc(P1, P4)

such as:

$$xcalc(P_1, P_4) =$$
$$a + bP_1 + c\ln\left[\frac{P_4 - P_1}{P_4 + P_1}\right] + dP_1^2 + e\left(\ln\left[\frac{P_4 - P_1}{P_4 + P_1}\right]\right)^2 + fP_1\ln\left[\frac{P_4 - P_1}{P_4 + P_1}\right] +$$
$$gP_1^3 + h\left(\ln\left[\frac{P_4 - P_1}{P_4 + P_1}\right]\right)^3 + iP_1\left(\ln\left[\frac{P_4 - P_1}{P_4 + P_1}\right]\right)^2 + jP_1^2\ln\left[\frac{P_4 - P_1}{P_4 + P_1}\right]$$

$$KY(xcalc) = A + B\frac{\ln[xcalc]}{xcalc}$$

and $$Mcalc = \dot{m}_{mixture} = KY(xcalc)\frac{\pi}{4}d^2\sqrt{2\rho_{air}P_1}$$

where, $\dot{m}$=total mass flow rate, $$\dot{m} = KY\frac{\pi}{4}d^2\sqrt{2\rho\Delta P},$$

K=flow coefficient,
Y=expansion factor,
d=orifice diameter=βD,
D=pipe diameter,

ρ=density of gas, liquid, or mixture,

ΔP=pressure drop across orifice plate, $P_1$, $P_4$=pressure differential measured across the two plates, $$M=\dot{m}_{mixture}=\dot{m}_{air}+\dot{m}_{water},$$

and $$x = \frac{\dot{m}_{air}}{\dot{m}_{air}+\dot{m}_{water}} = \frac{\dot{m}_{air}}{M}.$$

4. The multiple-phase flow meter of claim 1 wherein the at least one obstruction flow meter comprises a plate with a plurality of openings defined therein, the plurality of openings arranged in a predetermined pattern.

5. The multiple-phase flow meter of claim 4 wherein the plurality of openings on the plate comprise:
- a first series of openings positioned in an inner circle, the first series of openings having a combined area, the inner circle having a surface area;
- at least one second series of openings positioned in a ring concentric to the inner circle, the at least one second series of openings having a combined area, the ring having a surface area; and
- a first ratio of the combined area of the first series of openings to the inner circle surface area being substantially the same as at least one second ratios of the combined area of the subsequent series of openings to the ring surface area.

6. The multiple-phase flow meter of claim 4 wherein the plurality of openings on the plate comprise:
- at least two concentric series of openings positioned in at least two concentric circular areas on the plate, the openings of each of the at least two concentric series of openings having a combined area, the at least two concentric circular areas each having a surface area; and
- ratios of the combined area of each of the at least two concentric series of openings to its respective circular area surface area being substantially the same.

7. The multiple-phase flow meter of claim 1 wherein the at least two flow meters comprises a first obstruction flow meter and a second obstruction flow meter, wherein the plurality of sensors comprise a first pressure sensor disposed in the upstream side of the first obstruction flow meter, second and third pressure sensors disposed in the intermediate region between the first and second obstruction flow meters, a fourth pressure sensor disposed in the downstream side of the second obstruction flow meter, and a temperature sensor disposed in the conduit.

8. The multiple-phase flow meter of claim 1 wherein the at least two flow meters comprises a first obstruction flow meter and a second obstruction flow meter, wherein the plurality of sensors comprises a first pressure sensor disposed in the upstream side of the first obstruction flow meter, a second pressure sensor disposed in the intermediate region between the first and second obstruction flow meters, a third pressure sensor disposed in the downstream side of the second obstruction flow meter, and a temperature sensor disposed in the conduit.

9. The multiple-phase flow meter of claim 1 wherein the at least two flow meters comprises first, second and third obstruction flow meters, wherein the plurality of sensors comprises a first pressure sensor disposed in the upstream side of the first obstruction flow meter, second and third pressure sensors disposed in the intermediate region between the first and second obstruction flow meters, fourth and fifth pressure sensors disposed in the intermediate region of the second and third obstruction flow meters, a sixth pressure sensor disposed in the downstream side of the third obstruction flow meter, and a temperature sensor disposed in the conduit.

10. The multiple-phase flow meter of claim 1 wherein the at least two flow meters comprises first, second and third obstruction flow meters, wherein the plurality of sensors comprises a first pressure sensor disposed in the upstream side of the first obstruction flow meter, a second pressure sensor disposed in the intermediate region between the first and second obstruction flow meters, a third pressure sensor disposed in the intermediate region of the second and third obstruction flow meters, a fourth pressure sensor disposed in the downstream side of the third obstruction flow meter, and a temperature sensor disposed in the conduit.

11. The multiple-phase flow meter of claim 1 wherein the at least two flow meters comprises an obstruction flow meter and at least one non-obstruction flow meter, wherein the plurality of sensors comprise a first pressure sensor disposed in the upstream side of the obstruction flow meter, second and third pressure sensors disposed in the intermediate region between the obstruction flow meter and the at least one non-obstruction flow meter, a fourth pressure sensor disposed in the downstream side of the at least one non-obstruction flow meter, and a temperature sensor disposed in the conduit.

12. The multiple-phase flow meter of claim 11 wherein the at least one non-obstruction flow meter is a vortex meter.

13. The multiple-phase flow meter of claim 11 wherein the at least one non-obstruction flow meter is a Venturi meter.

14. The multiple-phase flow meter of claim 11 wherein the at least one non-obstruction flow meter is a densitometer.

15. The multiple-phase flow meter of claim 1 further comprising a memory device coupled to the processor.

16. The multiple-phase flow meter of claim 1 wherein the spacing between adjacent flow meters is equal to at least one diameter of the conduit.

17. The multiple-phase flow meter of claim 1 wherein the spacing between adjacent flow meters is between one and 12 diameters of the conduit.

18. The multiple-phase flow meter of claim 2 wherein a thickness of the upstream obstruction flow meter is equal to between four and eight widths of an opening in the plate.

19. A method for measuring a multiple-phase flow of a fluid in a conduit, comprising steps of:
- measuring at least one pressure and a temperature of the fluid;
- measuring at least one pressure differential of the fluid across each of at least two flow meters including at least one obstruction flow meter serially disposed in the conduit, the spacing between the at least two flow meters being such that a percentage of flow constituents remains the same between the at least two flow meters; and
- generating a flow rate of each phase of the fluid from the at least one pressure, the temperature, and the at least one pressure differential by calculating a quality of the multiple-phase flow.

20. The method, as set forth in claim 19, wherein flow rate generating comprises computing quality and total mass flow rate of the multiple-phase flow by:

$$x=xcalc(P1, P4)$$

such as:

$$xcalc(P_1, P_4) = a + bP_1 + c\ln\left[\frac{P_1}{P_4}\right] + dP_1^2 + e\left(\ln\left[\frac{P_1}{P_4}\right]\right)^2 +$$
$$fP_1\ln\left[\frac{P_1}{P_4}\right] + gP_1^3 + h\left(\ln\left[\frac{P_1}{P_4}\right]\right)^3 + iP_1\left(\ln\left[\frac{P_1}{P_4}\right]\right)^2 + jP_1^2\ln\left[\frac{P_1}{P_4}\right]$$

$$KY(xcalc) = A + B\frac{\ln[xcalc]}{xcalc}$$

and $$Mcalc = \dot{m}_{mixture} = KY(xcalc)\frac{\pi}{4}d^2\sqrt{2\rho_{air}P_1}$$

where, $\dot{m}$=total mass flow rate, $$\dot{m} = KY\frac{\pi}{4}d^2\sqrt{2\rho\Delta P},$$

K=flow coefficient,
Y=expansion factor,
d=orifice diameter=$\beta$D,
D=pipe diameter,
$\rho$=density of gas, liquid, or mixture,
$\Delta P$=pressure drop across orifice plate,
$P_1$, $P_4$=pressure differential measured across the two plates, $$M = \dot{m}_{mixture} = \dot{m}_{air} + \dot{m}_{water},$$

and $$x = \frac{\dot{m}_{air}}{\dot{m}_{air} + \dot{m}_{water}} = \frac{\dot{m}_{air}}{M}.$$

21. The method, as set forth in claim 19, wherein flow rate generating comprises computing quality and total mass flow rate of the multiple-phase flow by:

x=xcalc(P1,P4)

$$xcalc(P_1, P_4) =$$
$$a + bP_1 + c\ln\left[\frac{P_4 - P_1}{P_4 + P_1}\right] + dP_1^2 + e\left(\ln\left[\frac{P_4 - P_1}{P_4 + P_1}\right]\right)^2 + fP_1\ln\left[\frac{P_4 - P_1}{P_4 + P_1}\right] +$$
$$gP_1^3 + h\left(\ln\left[\frac{P_4 - P_1}{P_4 + P_1}\right]\right)^3 + iP_1\left(\ln\left[\frac{P_4 - P_1}{P_4 + P_1}\right]\right)^2 + jP_1^2\ln\left[\frac{P_4 - P_1}{P_4 + P_1}\right]$$

$$KY(xcalc) = A + B\frac{\ln[xcalc]}{xcalc}$$

and $$Mcalc = \dot{m}_{mixture} = KY(xcalc)\frac{\pi}{4}d^2\sqrt{2\rho_{air}P_1}$$

where, $\dot{m}$=total mass flow rate, $$\dot{m} = KY\frac{\pi}{4}d^2\sqrt{2\rho\Delta P},$$

K=flow coefficient,
Y=expansion factor,
d=orifice diameter=$\beta$D,
D=pipe diameter,
$\rho$=density of gas, liquid, or mixture,
$\Delta P$=pressure drop across orifice plate,
$P_1$, $P_4$=pressure differential measured across the two plates, $$M = \dot{m}_{mixture} = \dot{m}_{air} + \dot{m}_{water},$$

and $$x = \frac{\dot{m}_{air}}{\dot{m}_{air} + \dot{m}_{water}} = \frac{\dot{m}_{air}}{M}.$$

22. The method, as set forth in claim 19, wherein flow rate generating comprises:
   calculating at least one discharge coefficient;
   calculating at least one Reynolds number (Re) and at least one quality (x); and
   calculating at least one flow rate.

23. The method, as set forth in claim 22, wherein the at least one discharge coefficient calculating step comprises solving an equation wherein each of the at least one discharge coefficients is a function of the at least one pressure, the temperature, and the at least one pressure differential.

24. The method, as set forth in claim 22, wherein the at least one Reynolds number and at least one quality calculating step comprises solving two equations with two unknowns from the generalized equation:

$$Re = f[C_{d,i}(x,Re)Y_i D\beta_i^2(2\rho_i \Delta P_i)^{1/2}]/[\mu(1-\beta_i^4)]^{1/2}$$

wherein i is the index number of the obstruction flow meters considered.

25. The method, as set forth in claim 19, further comprising spacing adjacent flow meters such that the downstream flow meter encounters little of the flow profile distortion introduced by the upstream flow meter, so that the performance of the downstream flow meter is not significantly degraded.

26. The method, as set forth in claim 19, further comprising spacing adjacent flow meters between one and 12 diameters of the conduit apart.

27. The method, as set forth in claim 19, further comprising using an obstruction flow meter with openings of a predetermined width, and a thickness of four to eight widths of the opening with the thickness increasing with increasing amounts of swirl in the conduit upstream of the flow meter.

28. A method for measuring a multiple-phase flow of a fluid in a conduit, comprising steps of:
   measuring at least one pressure and a temperature of the fluid;
   measuring at least one pressure differential of the fluid across each of at least two flow meters including at least one obstruction flow meter and one densitometer operable to be serially disposed in the conduit;
   measuring a density of the fluid, $\rho_{mixture}$, such that $$\rho_{mixture} = (1-x)\rho_{liquid} + x\rho_{gas}$$

and
   computing flow quality, x, from the measured density to yield xcalc and computing total mass flow rate of the multiple-phase flow by determining discharge coefficient of the at least one obstruction flow meter, and then computing:

$$KY(xcalc) = A + B\frac{\ln[xcalc]}{xcalc}$$

and $$Mcalc = \dot{m}_{mixture} = KY(xcalc)\frac{\pi}{4}d^2\sqrt{2\rho_{air}P_1}$$

where, $\dot{m}$=total mass flow rate, $$\dot{m} = KY\frac{\pi}{4}d^2\sqrt{2\rho\Delta P},$$

K=flow coefficient,
Y=expansion factor,
d=orifice diameter=$\beta$D,
D=pipe diameter,
$\rho$=density of gas, liquid, or mixture,
$\Delta$P=pressure drop across orifice plate,
$P_1$, $P_4$=pressure differential measured across the two plates, $$M=\dot{m}_{mixture}=\dot{m}_{air}+\dot{m}_{water},$$

and $$x = \frac{\dot{m}_{air}}{\dot{m}_{air}+\dot{m}_{water}} = \frac{\dot{m}_{air}}{M}$$

= calculated from the output of the densitometer.

=calculated from the output of the densitometer.

29. A multiple-phase flow meter for measuring a mixture of offshore petroleum products flowing in a conduit, comprising:
 three flow meters including at least two obstruction flow meters serially disposed in the conduit so that each of the three obstruction flow meters have an upstream side and a downstream side, and any two adjacent flow meters have an intermediate region therebetween, the at least two flow meters being an upstream flow meter and a downstream flow meter and being spaced at a minimum such that downstream flow meter encounters little of the flow profile distortion caused by the upstream flow meter as to degrade its performance, and spaced at a maximum such that the percentage of flow constituents remains substantially the same from the upstream flow meter to the downstream flowmeter;
 a plurality of sensors operable to be located upstream, downstream, and in the intermediate region of the three flow meters, the plurality of sensors measuring predetermined characteristics of the multiple-phase flow; and
 a computer coupled to the plurality of sensors and capable of computing the total mass flow rate of the multiple phase flow by calculating a quality of the multiple-phase flow based on the measured predetermined characteristics.

30. The multiple-phase flow meter of claim 29 wherein the computer is operable to plot and curve fit flow quality, x, as a function of pressure differential across the three flow meters, P1, P2, and P3:

x=xcalc(P1, P2, P3)

where:

$$x = \frac{\dot{m}_{gas}}{\dot{m}_{total}}$$

and plotting total mass flow rate as a function of P1, P2, and P3, and performing a curve fit of the total mass flow rate plot to compute a total mass flow rate, and determining the mass flow rates of each flow component using the total mass flow rate by plotting and curve fitting density of the flow liquid mixture as a function of x, P1, P2, and P3, and calculating the fraction of the liquid that is composed of liquid1, where:

$$\gamma = \frac{\dot{m}_{liquid1}}{\dot{m}_{liquid1}+\dot{m}_{liquid2}} = \frac{\dot{m}_{liquid1}}{\dot{m}_{liquid}}$$

$$x = \frac{\dot{m}_{gas}}{\dot{m}_{gas}+\dot{m}_{liquid}}$$

$$\dot{m}_{total}=\dot{m}_{gas}+\dot{m}_{liquid}=\dot{m}_{gas}+\dot{m}_{liquid1}+\dot{m}_{liquid2}$$

$$\rho_{liquid}=(1-\gamma)\rho_{liquid1}+\gamma\rho_{liquid2}$$

31. The multiple-phase flow meter of claim 29 wherein each of the three flow meters comprises a plate with a plurality of openings defined therein, the plurality of openings arranged in a predetermined pattern.

32. The multiple-phase flow meter of claim 31 wherein the plurality of openings on the plate comprise:
 at least two concentric series of openings positioned in at least two concentric circular areas on the plate, the openings of each of the at least two concentric series of openings having a combined area, the at least two concentric circular areas each having a surface area; and
 ratios of the combined area of each of the at least two concentric series of openings to its respective circular area surface area being substantially the same.

33. The multiple-phase flow meter of claim 29 wherein at least one flow meter is a vortex meter.

34. The multiple-phase flow meter of claim 29 wherein at least one flow meter is a Venturi meter.

35. The multiple-phase flow meter of claim 29 wherein at least one flow meter is a densitometer.

36. The multiple-phase flow meter of claim 29 wherein the spacing between adjacent flow meters is equal to at least one diameter of the conduit.

37. The multiple-phase flow meter of claim 29 wherein the spacing between adjacent flow meters is between one and 12 diameters of the conduit.

38. The multiple-phase flow meter of claim 30 wherein a thickness of the upstream obstruction flow meter is variable from four to eight widths of an opening in the plate depending upon the amount of swirl present upstream of the flow meter, where the thickness of the upstream obstruction flow meter increases with increasing swirl.

39. A method for determining a multiple-phase flow of a fluid in a conduit, comprising steps of:
 measuring a pressure differential across at least two obstruction flow meters serially disposed in the conduit, P1 and P2, respectively;
 plotting quality as a function of P1 and P2;
 curve fitting the plot and generating a flow quality function,
 determining flow quality using the flow quality function;

determining a discharge coefficient from the flow quality; and determining a total mass flow rate using;

$$\dot{m} = KY\frac{\pi}{4}d^2\sqrt{2\rho\Delta P}$$

where, $\dot{m}$=total mass flow rate,
K=flow coefficient,
Y=expansion factor,
d=orifice diameter=$\beta$D,
D=pipe diameter,
$\rho$=density of gas, liquid, or mixture,
$\Delta P$ =pressure drop across orifice plate.

40. The method, as set forth in claim 39, wherein plotting quality comprises computing:

x=xcalc(P1,P2)

such as:

$$xcalc(P_1, P_2) = a + bP_1 + c\ln\left[\frac{P_1}{P_2}\right] + dP_1^2 + \left(e\left(\ln\left[\frac{P_1}{P_2}\right]\right)\right)^2 +$$
$$fP_1\ln\left[\frac{P_1}{P_2}\right] + gP_1^3 + \left(h\left(\ln\left[\frac{P_1}{P_2}\right]\right)\right)^3 + \left(iP_1\left(\ln\left[\frac{P_1}{P_2}\right]\right)\right)^2 + jP_1^2\ln\left[\frac{P_1}{P_2}\right]$$

where, $M = \dot{m}_{mixture} = \dot{m}_{air} + \dot{m}_{liquid}$, and $$x = \frac{\dot{m}_{air}}{\dot{m}_{air} + \dot{m}_{liquid}} = \frac{\dot{m}_{air}}{M}.$$

41. The method, as set forth in claim 39, wherein plotting quality comprises computing:

x=xcalc(P1,P2)

such as:

$xcalc(P_1, P_2) =$
$$a + bP_1 + c\ln\left[\frac{P_2 - P_1}{P_2 + P_1}\right] + dP_1^2 + e\left(\ln\left[\frac{P_2 - P_1}{P_2 + P_1}\right]\right)^2 + fP_1\ln\left[\frac{P_2 - P_1}{P_2 + P_1}\right] +$$
$$gP_1^3 + h\left(\ln\left[\frac{P_2 - P_1}{P_2 + P_1}\right]\right)^3 + iP_1\left(\ln\left[\frac{P_2 - P_1}{P_2 + P_1}\right]\right)^2 + jP_1^2\ln\left[\frac{P_2 - P_1}{P_2 + P_1}\right]$$

where, $M = \dot{m}_{mixture} = \dot{m}_{air} + \dot{m}_{liquid}$, and $$x = \frac{\dot{m}_{air}}{\dot{m}_{air} + \dot{m}_{liquid}} = \frac{\dot{m}_{air}}{M}.$$

42. The method, as set forth in claim 39, further comprising spacing adjacent flow meters between one and 12 diameters of the conduit apart.

43. The method, as set forth in claim 39, further comprising using an obstruction flow meter with openings of a predetermined width, and a thickness of four to eight widths of the opening with the thickness increasing with increasing amounts of swirl in the conduit upstream of the flow meter.

44. The method, as set forth in claim 39, further comprising:

measuring a third pressure differential, P3, across a third obstruction flow meter;

plotting flow quality, x, as a function of P1, P2 and P3, which is:

$$x = \frac{\dot{m}_{gas}}{\dot{m}_{total}}$$

and performing a curve fit of the flow quality plot to compute the flow quality;

plotting total mass flow rate as a function of P1, P2, and P3 and performing a curve fit of the plot to compute a total mass flow rate; and determining the mass flow rates of each flow component using the total mass flow rate by plotting and curve fitting density of the flow components as a function of P1, P2, and P3.

45. The method, as set forth in claim 44, further comprising determining the density of the liquid mixture in the flow, where:

$$\gamma = \frac{\dot{m}_{liquid1}}{\dot{m}_{liquid1} + \dot{m}_{liquid2}} = \frac{\dot{m}_{liquid1}}{\dot{m}_{liquid}}$$

$$x = \frac{\dot{m}_{gas}}{\dot{m}_{gas} + \dot{m}_{liquid}}$$

$\dot{m}_{total} = \dot{m}_{gas} + \dot{m}_{liquid} = \dot{m}_{gas} + \dot{m}_{liquid1} + \dot{m}_{liquid2}$ $\rho_{liquid} = (1-\gamma)\rho_{liquid1} + \gamma\rho_{liquid2}$

46. The method, as set forth in claim 45, wherein flow rates of N phases are determined by using N flow meters and measuring N pressure differentials across the N flow meters and plotting flow quality as a function of the N pressure differentials.

47. The multiple-phase flow meter of claim 1, wherein the processor is further capable of computing the flow rate of the multiple-phase flow by calculating a quality of the multiple-phase flow independent of any phase ratio calculation.

48. The method of claim 19 wherein generating a flow rate by calculating a gas quality of the multiple-phase flow comprises calculating a gas quality of the multiple-phase flow independent of a phase ratio measurement.

* * * * *

UNITED STATES PATENT AND TRADEMARK OFFICE
CERTIFICATE OF CORRECTION

PATENT NO.    : 6,422,092 B1
DATED         : July 23, 2002
INVENTOR(S)   : Gerald L. Morrison et al.

It is certified that error appears in the above-identified patent and that said Letters Patent is hereby corrected as shown below:

Column 3,
Line 61, after "quality", delete "," and insert -- ; --.

Column 4,
Line 32, after "ß²", insert -- . --.
Line 38, after "a", delete "P" and insert -- ß --.

Column 5,
Line 32, after "performance", delete "," and insert -- . --.

Column 6,
Line 40, after "subscript", insert -- "i" --.
Line 48, after "[μ(1", insert -- – --.

Column 7,
Line 16, after "quantities", delete "Yi" and insert -- $Y_i$ --.
Line 17, after "quantities", delete "β$_i$", and insert -- $ρ_i$ --.
Line 44, after "P", delete "$_i$" and insert -- $_1$ --.
Line 46, after "ρ", delete "$_i$", and insert -- $_1$ --.
Line 51, after "$c_1$=", delete "2.4594207", and insert -- 2.4584207 --.

Column 8,
Line 11, delete "$C_{d.1}$" and insert -- $C_{d,1}$ --.
Line 12, delete "$C_{d.2}$" and insert -- $C_{d,2}$ --.
Line 40, after "oil", delete ",", and insert -- . --.

UNITED STATES PATENT AND TRADEMARK OFFICE
CERTIFICATE OF CORRECTION

PATENT NO.   : 6,422,092 B1
DATED        : July 23, 2002
INVENTOR(S)  : Gerald L. Morrison et al.

It is certified that error appears in the above-identified patent and that said Letters Patent is hereby corrected as shown below:

Column 12,
Line 4, after "resulting", delete "is" and insert -- in --.
Line 50, after "$\gamma$", delete "tan", and insert -- can --.

Column 13,
Line 12, after "substantially the", delete "game" and insert -- same --.

Column 14,
Line 1, after "claim", insert -- 1 --.

Column 17,
Line 3, after "$_{mixture}$", delete "+", and insert -- = --.
Line 16, after "x=xcalc(P1,P4)", insert -- such as --.

Column 19,
Line 14, delete the second occurrence of the phrase "=calculated from the output of the densitometer."

Column 20,
Line 47, after "function", delete ",", and insert -- ; --.

Column 21,
Line 3, after "xcalc", delete "(P1.P2)", and insert -- (P1, P2) --.

UNITED STATES PATENT AND TRADEMARK OFFICE
CERTIFICATE OF CORRECTION

PATENT NO. : 6,422,092 B1
DATED : July 23, 2002
INVENTOR(S) : Gerald L. Morrison et al.

It is certified that error appears in the above-identified patent and that said Letters Patent is hereby corrected as shown below:

Column 21, cont'd,
Line 5, after "such as:", delete the equation, and insert --

$$xcalc(P_1, P_2) = a + b\, P_1 + c \ln\left[\frac{P_1}{P_2}\right] + d\, P_1^2 + e\left(\ln\left[\frac{P_1}{P_2}\right]\right)^2$$

$$+ f\, P_1 \ln\left[\frac{P_1}{P_2}\right] + g\, P_1^3 + h\left(\ln\left[\frac{P_1}{P_2}\right]\right)^3 + i\, P_1\left(\ln\left[\frac{P_1}{P_2}\right]\right)^2 + j\, P_1^2 \ln\left[\frac{P_1}{P_2}\right]$$

--.

Signed and Sealed this

Eleventh Day of February, 2003

JAMES E. ROGAN
*Director of the United States Patent and Trademark Office*